(12) United States Patent
Fukunaga

(10) Patent No.: US 9,334,014 B2
(45) Date of Patent: May 10, 2016

(54) BICYCLE SPROCKET AND BICYCLE SPROCKET ASSEMBLY

(71) Applicant: SHIMANO INC., Sakai (JP)

(72) Inventor: Yasufumi Fukunaga, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 14/474,275

(22) Filed: Sep. 1, 2014

(65) Prior Publication Data

US 2016/0059930 A1  Mar. 3, 2016

(51) Int. Cl.
  *F16H 55/12* (2006.01)
  *F16H 55/30* (2006.01)
  *B62M 9/10* (2006.01)
  *F16H 55/08* (2006.01)

(52) U.S. Cl.
  CPC ............... *B62M 9/10* (2013.01); *F16H 55/08* (2013.01); *F16H 55/30* (2013.01)

(58) Field of Classification Search
  CPC .......... B62M 9/10; B62M 9/105; B62M 9/12; F16H 55/303; F16H 55/08
  USPC ......................................................... 474/160
  See application file for complete search history.

(56) References Cited

U.S. PATENT DOCUMENTS

| | | | | |
|---|---|---|---|---|
| 4,439,172 A * | 3/1984 | Segawa | ................... | B62M 9/105 474/144 |
| 5,078,653 A * | 1/1992 | Nagano | ................... | B62M 9/10 474/160 |
| 5,085,621 A * | 2/1992 | Nagano | ................... | B62M 9/10 474/160 |
| 5,192,249 A * | 3/1993 | Nagano | ................... | B62M 9/10 474/160 |
| 5,273,495 A * | 12/1993 | Nagano | ................... | B62M 9/00 474/144 |
| 5,876,296 A * | 3/1999 | Hsu | ................... | B62M 9/10 474/140 |
| 6,340,338 B1 * | 1/2002 | Kamada | ................... | B62M 9/122 474/152 |
| 6,572,500 B2 * | 6/2003 | Tetsuka | ................... | B62M 9/10 474/160 |
| 8,092,329 B2 * | 1/2012 | Wickliffe | ................... | B62M 9/105 474/160 |
| 8,100,795 B2 * | 1/2012 | Reiter | ................... | B62M 9/10 474/160 |
| 8,226,511 B2 * | 7/2012 | Kamada | ................... | B62M 9/10 474/152 |
| 8,235,850 B2 * | 8/2012 | Lin | ................... | B62M 9/105 474/160 |
| 8,506,436 B2 * | 8/2013 | Wickiffe | ................... | B62M 9/105 474/160 |
| 8,617,015 B2 * | 12/2013 | Wickliffe | ................... | B62M 9/10 474/140 |

(Continued)

FOREIGN PATENT DOCUMENTS

| | | |
|---|---|---|
| EP | 0047927 | 3/1982 |
| JP | 62-23187 U | 2/1987 |
| JP | 62-65387 U | 4/1987 |

*Primary Examiner* — Henry Liu
(74) *Attorney, Agent, or Firm* — Mori & Ward, LLP

(57) ABSTRACT

A bicycle sprocket has a rotational center axis. The bicycle sprocket comprises a sprocket body and a chain engagement structure. The sprocket body has an axial width defined in an axial direction parallel to the rotational center axis. The chain engagement structure is arranged on a radially outer periphery of the sprocket body. The chain engagement structure includes at least one shifting facilitation area and a plurality of chain-engaging teeth. The at least one shifting facilitation area is configured to facilitate changing gears. The plurality of chain-engaging teeth include at least two neighboring chain-engaging teeth each including a chain-engaging portion configured to engage with a bicycle chain. The chain-engaging portion has an axial chain-engaging width defined in the axial direction. The axial chain-engaging width is larger than the axial width of the sprocket body.

25 Claims, 18 Drawing Sheets

(56) References Cited

U.S. PATENT DOCUMENTS

| | | | | |
|---|---|---|---|---|
| 8,821,329 B2* | 9/2014 | Wickliffe | B62M 9/105 | 474/140 |
| 2007/0054768 A1* | 3/2007 | Miyazawa | F16H 55/30 | 474/152 |
| 2009/0111631 A1* | 4/2009 | Wickliffe | B62M 9/105 | 474/152 |
| 2010/0004081 A1* | 1/2010 | Braedt | B62M 9/12 | 474/160 |
| 2010/0137086 A1* | 6/2010 | Lin | B62M 9/105 | 474/160 |
| 2012/0202633 A1* | 8/2012 | Wickliffe | B62M 9/105 | 474/160 |
| 2012/0244977 A1* | 9/2012 | Liao | B62M 9/10 | 474/160 |
| 2013/0139642 A1* | 6/2013 | Reiter | B62M 9/105 | 74/594.2 |
| 2013/0316863 A1* | 11/2013 | Reiter | B62M 9/10 | 474/160 |
| 2013/0331210 A1* | 12/2013 | Wickliffe | B62M 9/105 | 474/78 |
| 2014/0113757 A1* | 4/2014 | Wickliffe | B62M 9/10 | 474/160 |
| 2014/0371014 A1* | 12/2014 | Wickliffe | B62M 9/105 | 474/152 |

\* cited by examiner

BICYCLE SPROCKET AND BICYCLE SPROCKET ASSEMBLY

BACKGROUND OF THE INVENTION

1. Field of the Invention

The present invention relates to a bicycle sprocket and a bicycle sprocket assembly.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been recently redesigned is a bicycle sprocket.

Most bicycles have a drive train that uses the bicycle sprocket to transmit the pedaling action from the rider to a bicycle wheel through a bicycle chain. A front sprocket and a rear sprocket have been known as the bicycle sprocket. The bicycle sprocket generally includes a plurality of teeth to engage with the bicycle chain. Such sprockets have been also known in a technical field other than the bicycle field (e.g., Japanese Unexamined Patent Application Publications No. S62-023187 and No. S62-065387).

SUMMARY OF THE INVENTION

In accordance with a first aspect of the present invention, a bicycle sprocket has a rotational center axis. The bicycle sprocket comprises a sprocket body and a chain engagement structure. The sprocket body has an axial width defined in an axial direction parallel to the rotational center axis. The chain engagement structure is arranged on a radially outer periphery of the sprocket body. The chain engagement structure includes at least one shifting facilitation area and a plurality of chain-engaging teeth. The at least one shifting facilitation area is configured to facilitate changing gears. The plurality of chain-engaging teeth include at least two neighboring chain-engaging teeth each including a chain-engaging portion configured to engage with a bicycle chain. The chain-engaging portion has an axial chain-engaging width defined in the axial direction. The axial chain-engaging width is larger than the axial width of the sprocket body.

In accordance with a second aspect of the present invention, the bicycle sprocket according to the first aspect is configured so that the at least one shifting facilitation area includes an axially recessed portion.

In accordance with a third aspect of the present invention, the bicycle sprocket according to the first aspect is configured so that the at least one shifting facilitation area includes a tooth-free gap from which an additional chain-engaging tooth is free between adjacent two of the plurality of chain-engaging teeth.

In accordance with a fourth aspect of the present invention, the bicycle sprocket according to the first aspect is configured so that the chain engagement structure includes, as the at least one shifting facilitation area, at least one downshifting facilitation area configured to facilitate shifting the bicycle chain from a neighboring smaller sprocket toward the bicycle sprocket. The neighboring smaller sprocket is adjacent to the bicycle sprocket without another sprocket and has a total number of teeth less than a total number of the plurality of chain-engaging teeth.

In accordance with a fifth aspect of the present invention, the bicycle sprocket according to the first aspect is configured so that the chain engagement structure includes, as the at least one shifting facilitation area, at least one upshifting facilitation area configured to facilitate shifting the bicycle chain from the bicycle sprocket toward a neighboring smaller sprocket. The neighboring smaller sprocket is adjacent to the bicycle sprocket without another sprocket and has a total number of teeth less than a total number of the plurality of chain-engaging teeth.

In accordance with a sixth aspect of the present invention, the bicycle sprocket according to the first aspect is configured so that the chain engagement structure includes, as the at least one shifting facilitation area, at least one downshifting facilitation area and at least one upshifting facilitation area. The at least one downshifting facilitation area is configured to facilitate shifting the bicycle chain toward the bicycle sprocket from a neighboring smaller sprocket which is adjacent to the bicycle sprocket without another sprocket and which has a total number of teeth less than a total number of the plurality of chain-engaging teeth. The at least one upshifting facilitation area is configured to facilitate shifting the bicycle chain from the bicycle sprocket toward the neighboring smaller sprocket.

In accordance with a seventh aspect of the present invention, the bicycle sprocket according to the first aspect is configured so that the bicycle sprocket body includes a hub engagement portion configured to engage with a bicycle hub assembly.

In accordance with an eighth aspect of the present invention, the bicycle sprocket according to the first aspect is configured so that the chain-engaging portion is configured to partly engage with a link plate of the bicycle chain in a radial direction of the bicycle sprocket.

In accordance with a ninth aspect of the present invention, the bicycle sprocket according to the first aspect is configured so that the axial chain-engaging width is smaller than an axial inner distance defined between opposed inner link plates of the bicycle chain in the axial direction. A difference between the axial chain-engaging width and the axial inner distance is equal to or smaller than 0.2 mm in the axial direction.

In accordance with a tenth aspect of the present invention, the bicycle sprocket according to the first aspect is configured so that the axial chain-engaging width is smaller than an axial inner distance defined between opposed inner link plates of the bicycle chain in the axial direction. A difference between the axial chain-engaging width and the axial inner distance is equal to or larger than 0.1 mm in the axial direction.

In accordance with an eleventh aspect of the present invention, a bicycle sprocket assembly comprises a plurality of the bicycle sprockets according to the first aspect.

In accordance with a twelfth aspect of the present invention, the bicycle sprocket assembly according to the eleventh aspect further comprises a hub engagement structure configured to engage with a bicycle hub assembly.

In accordance with a thirteenth aspect of the present invention, a bicycle sprocket assembly has a rotational center axis. The bicycle sprocket assembly comprises a first sprocket and a second sprocket. The first sprocket includes a first sprocket body and a first chain engagement structure. The first chain engagement structure is arranged on a radially outer periphery of the first sprocket body. The first chain engagement structure includes at least one first shifting facilitation area and a plurality of first chain-engaging teeth. The at least one first shifting facilitation area is configured to facilitate changing gears. At least one of the plurality of first chain-engaging teeth includes a first chain-engaging portion configured to engage with a bicycle chain. The first chain-engaging portion has a first axial chain-engaging width defined in an axial direction parallel to the rotational center axis. The second sprocket includes a second sprocket body and a second chain engagement structure. The second chain engagement structure is arranged on a radially outer periphery of the second sprocket body. The second chain engagement structure includes at least one second shifting facilitation area and a plurality of second chain-engaging teeth. The at least one second shifting facilitation area is configured to facilitate changing gears. At least one of the plurality of second chain-engaging teeth includes a second chain-engaging portion configured to engage with the bicycle chain. The second chain-engaging portion has a second axial chain-engaging width defined in the axial direction. The first axial chain-engaging width is different from the second axial chain-engaging width. A total number of the plurality of second chain-engaging teeth is smaller than a total number of the plurality of first chain-engaging teeth.

In accordance with a fourteenth aspect of the present invention, the bicycle sprocket assembly according to the thirteenth aspect is configured so that the second axial chain-engaging width is larger than the first axial chain-engaging width.

In accordance with a fifteenth aspect of the present invention, the bicycle sprocket assembly according to the thirteenth aspect is configured so the first sprocket body has a first axial width defined in the axial direction. The first axial chain-engaging width is larger than the first axial width of the first sprocket body.

In accordance with a sixteenth aspect of the present invention, the bicycle sprocket assembly according to the thirteenth aspect is configured so that the second sprocket body has a second axial width defined in the axial direction. The second axial chain-engaging width is larger than the second axial width of the second sprocket body.

In accordance with a seventeenth aspect of the present invention, a bicycle sprocket assembly has a rotational center axis. The bicycle sprocket assembly comprises a first sprocket, a second sprocket, a third sprocket, and a fourth sprocket. The first sprocket includes a first sprocket body and a first chain engagement structure. The first chain engagement structure is arranged on a radially outer periphery of the first sprocket body. The first chain engagement structure includes at least one first shifting facilitation area and a plurality of first chain-engaging teeth. The at least one first shifting facilitation area is configured to facilitate changing gears. At least one of the plurality of first chain-engaging teeth includes a first chain-engaging portion configured to engage with a bicycle chain, the first chain-engaging portion having a first axial chain-engaging width defined in an axial direction parallel to the rotational center axis. The second sprocket includes a second sprocket body and a second chain engagement structure. The second chain engagement structure is arranged on a radially outer periphery of the second sprocket body. The second chain engagement structure includes at least one second shifting facilitation area and a plurality of second chain-engaging teeth. The at least one second shifting facilitation area is configured to facilitate changing gears. At least one of the plurality of second chain-engaging teeth includes a second chain-engaging portion configured to engage with the bicycle chain. The second chain-engaging portion has a second axial chain-engaging width defined in the axial direction. A total number of the plurality of second chain-engaging teeth is smaller than a total number of the plurality of first chain-engaging teeth. The third sprocket is positioned between the first sprocket and the second sprocket in the axial direction and adjacent to the first sprocket without another sprocket. The third sprocket includes a third sprocket body and a third chain engagement structure. The third chain engagement structure is arranged on a radially outer periphery of the third sprocket body. The third chain engagement structure includes at least one third shifting facilitation area and a plurality of third chain-engaging teeth. The at least one third shifting facilitation area is configured to facilitate changing gears. At least one of the plurality of third chain-engaging teeth includes a third chain-engaging portion configured to engage with the bicycle chain. The third chain-engaging portion has a third axial chain-engaging width defined in the axial direction. A total number of the plurality of third chain-engaging teeth is smaller than the total number of the plurality of first chain-engaging teeth and larger than the total number of the plurality of second chain-engaging teeth. The fourth sprocket is positioned between the second sprocket and the third sprocket in the axial direction and adjacent to the second sprocket without another sprocket. The fourth sprocket includes a fourth sprocket body and a fourth chain engagement structure. The fourth chain engagement structure is arranged on a radially outer periphery of the fourth sprocket body. The fourth chain engagement structure includes at least one fourth shifting facilitation area and a plurality of fourth chain-engaging teeth. The at least one fourth shifting facilitation area is configured to facilitate changing gears. At least one of the plurality of fourth chain-engaging teeth includes a fourth chain-engaging portion configured to engage with the bicycle chain. The fourth chain-engaging portion has a fourth axial chain-engaging width defined in the axial direction. A total number of the plurality of fourth chain-engaging teeth is smaller than the total number of the plurality of third chain-engaging teeth and larger than the total number of the plurality of second chain-engaging teeth. The first chain-engaging portion of the first chain-engaging tooth is apart from the third chain-engaging portion of the third chain-engaging tooth by a first axial distance defined in the axial direction. The second chain-engaging portion of the second chain-engaging tooth is apart from the fourth chain-engaging portion of the fourth chain-engaging tooth by a second axial distance defined in the axial direction. The first axial distance is different from the second axial distance.

In accordance with an eighteenth aspect of the present invention, the bicycle sprocket assembly according to the seventeenth aspect is configured so that the second axial distance is larger than the first axial distance.

In accordance with a nineteenth aspect of the present invention, the bicycle sprocket assembly according to the seventeenth aspect is configured so that the first sprocket body has a first axial width defined in the axial direction. The first axial chain-engaging width is larger than the first axial width of the first sprocket body.

In accordance with a twentieth aspect of the present invention, the bicycle sprocket assembly according to the seventeenth aspect is configured so that the second sprocket body has a second axial width defined in the axial direction. The second axial chain-engaging width is larger than the second axial width of the second sprocket body.

In accordance with a twenty-first aspect of the present invention, the bicycle sprocket assembly according to the seventeenth aspect is configured so that the third sprocket body has a third axial width defined in the axial direction. The third axial chain-engaging width is larger than the third axial width of the third sprocket body.

In accordance with a twenty-second aspect of the present invention, the bicycle sprocket assembly according to the seventeenth aspect is configured so that the fourth sprocket body has a fourth axial width defined in the axial direction.

The fourth axial chain-engaging width is larger than the fourth axial width of the fourth sprocket body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
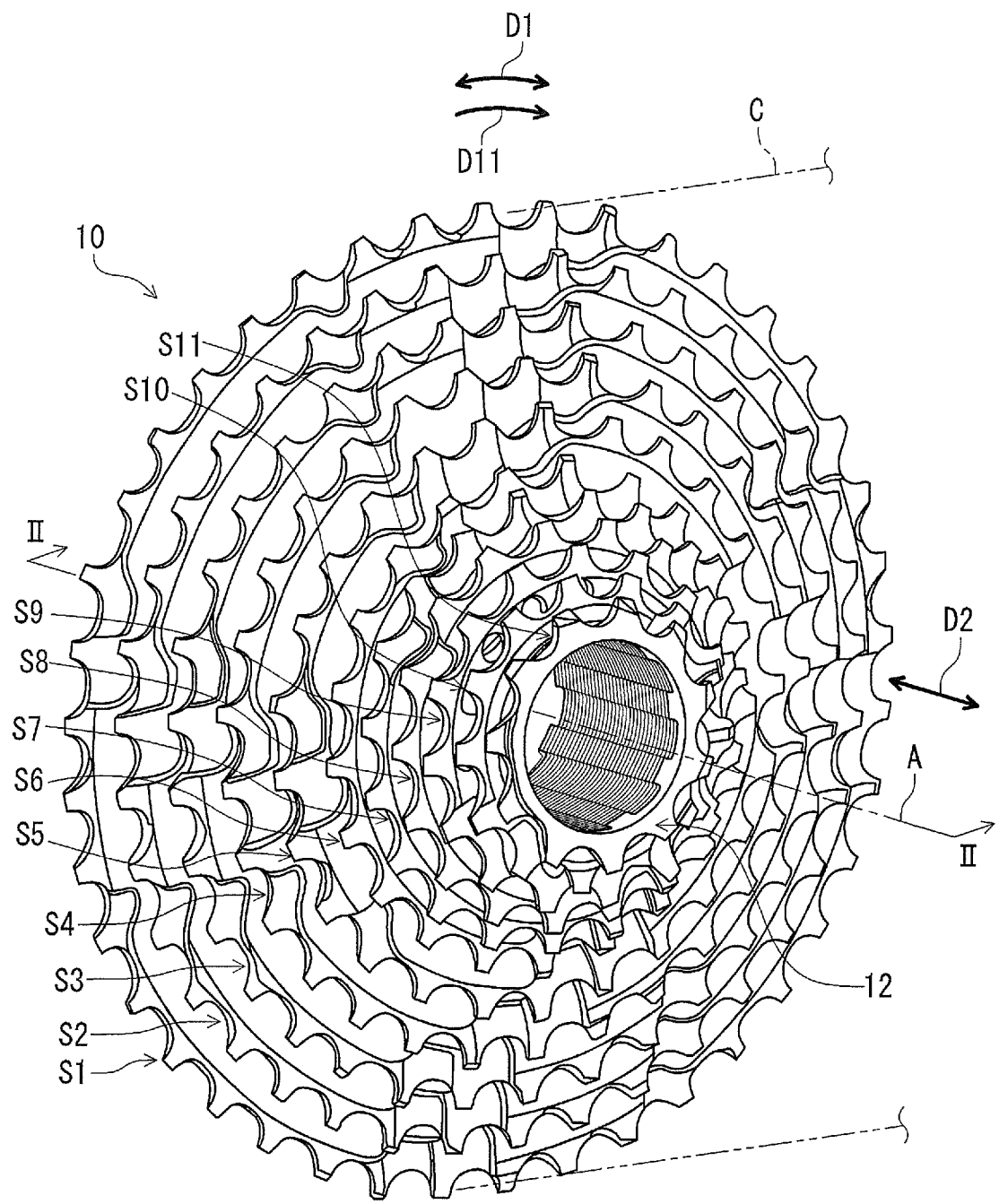
FIG. 1 is a perspective view of a bicycle sprocket assembly in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle sprocket assembly 10 in accordance with a first embodiment comprises a plurality of the bicycle sprockets. The bicycle sprocket assembly 10 is configured to engage with a bicycle chain C. In the illustrated embodiment, the bicycle sprocket assembly 10 comprises eleven bicycle sprockets S1 to S11. The bicycle sprocket assembly 10 has a rotational center axis A. The bicycle sprocket assembly 10 is configured to be rotated about the rotational center axis A in a rotational driving direction D11 during the pedaling. The rotational driving direction D11 is defined along a circumferential direction D1 of the bicycle sprocket assembly 10.

Figure 2:
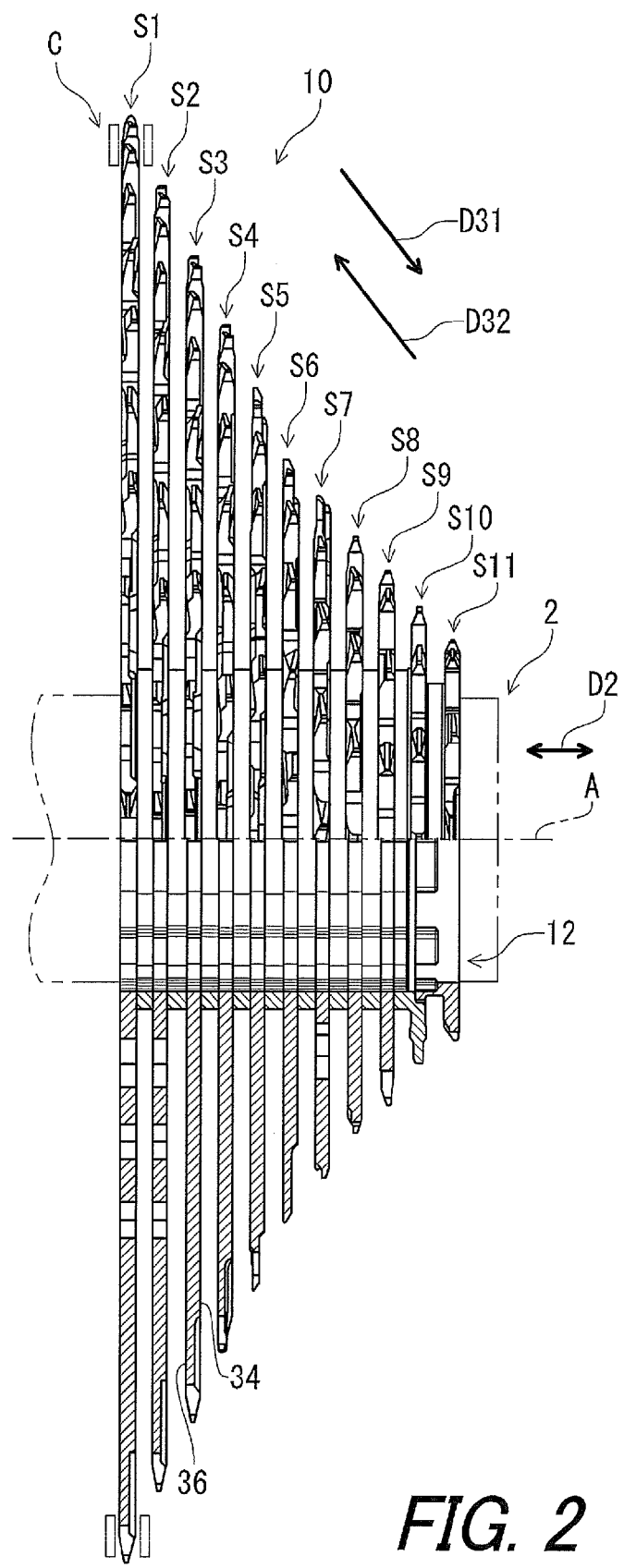
FIG. 2 is a rear elevational view of the bicycle sprocket assembly illustrated in FIG. 1 with a partial cross-sectional view taken along line II-II of FIG. 1.

As seen in FIG. 1, the bicycle sprocket assembly 10 further comprises a hub engagement structure 12 configured to engage with a bicycle hub assembly 2 (FIG. 2). While the bicycle sprocket assembly 10 is a rear sprocket assembly in the illustrated embodiment, structures of the bicycle sprocket assembly 10 can be applied to a front sprocket assembly if needed and/or desired.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle sprocket assembly 10 or the bicycle sprockets S1 to S11, should be interpreted relative to the bicycle equipped with the bicycle sprocket assembly 10 or the bicycle sprockets S1 to S11 as used in an upright riding position on a horizontal surface.

As seen in FIG. 2, the bicycle sprockets S1 to S11 are arranged in an axial direction D2 parallel to the rotational center axis A. The bicycle sprockets S1 to S11 are spaced apart from each other in the axial direction D2. Upshifting occurs when the bicycle chain C is shifted by a rear derailleur (not shown) from a larger sprocket to a neighboring smaller sprocket in an upshifting direction D31. Downshifting occurs when the bicycle chain C is shifted by the rear derailleur from a small sprocket to a neighboring larger sprocket in a downshifting direction D32.

Since the bicycle sprockets S1 to S10 have substantially the same structure as each other, the bicycle sprocket S3 will be described and/or illustrated in detail here and other bicycle sprockets will not be described and/or illustrated in detail for the sake of brevity. Structures of the bicycle sprocket S3 can be applied to the bicycle sprocket S11 if needed and/or desired. Structures of the bicycle sprocket S3 can be also applied to a front sprocket if needed and/or desired.

Figure 3:
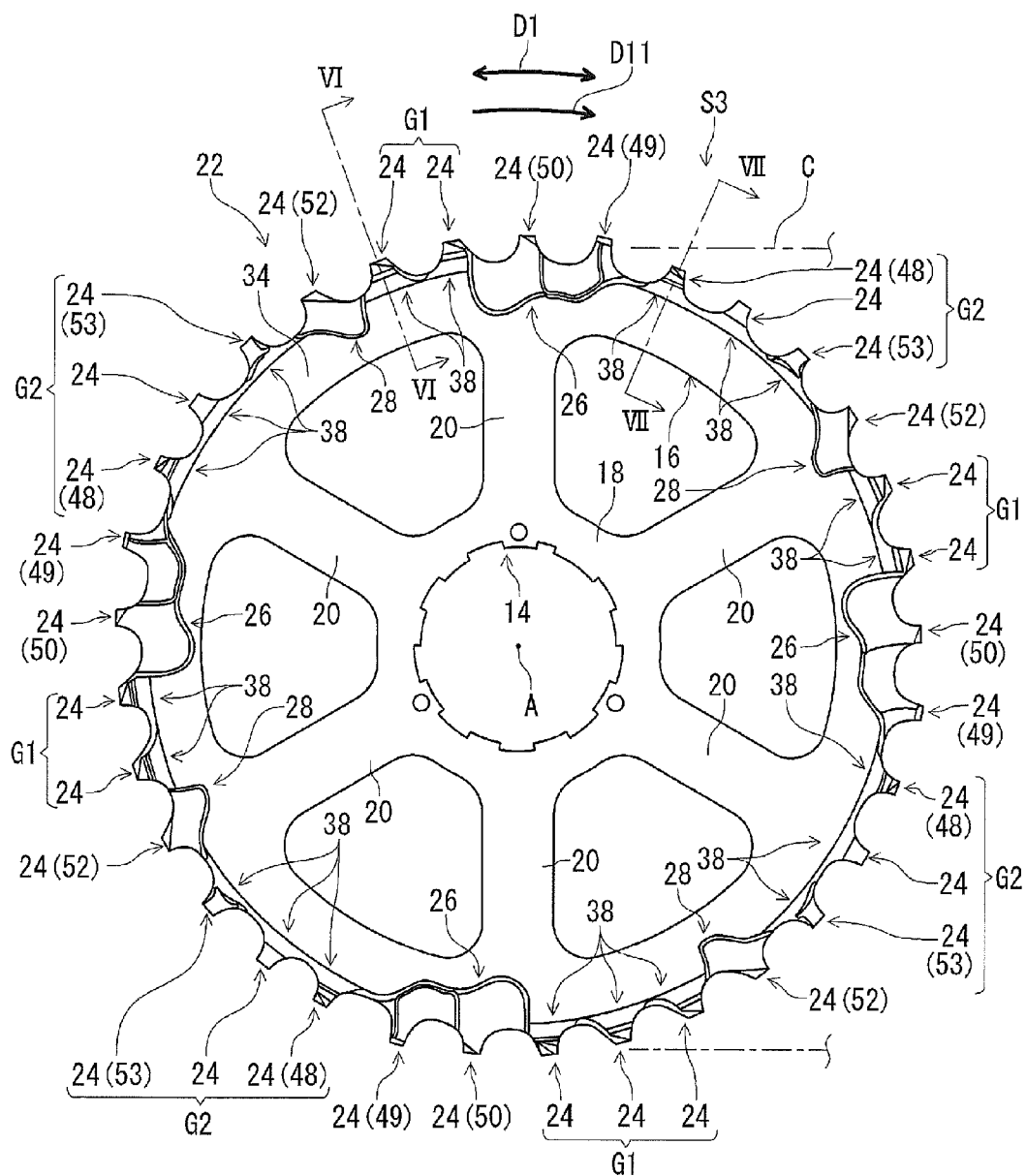
FIG. 3 is a right side elevational view of a bicycle sprocket of the bicycle sprocket assembly illustrated in FIG. 1.

As seen in FIG. 3, the bicycle sprocket S3 has the rotational center axis A. The bicycle sprocket S3 comprises a sprocket body 14. In the illustrated embodiment, the sprocket body 14 includes a base portion 16 having an annular shape. The sprocket body 14 includes a hub engagement portion 18 configured to engage with the bicycle hub assembly 2 (FIG. 2). The hub engagement portion 18 has an annular shape. The hub engagement portion 18 partially constitutes the hub engagement structure 12 (FIG. 2) of the bicycle sprocket assembly 10. The sprocket body 14 further includes arm portions 20 each connecting the base portion 16 with the hub engagement portion 18 in the illustrated embodiment. The arm portions 20 radially extend between the base portion 16 and the hub engagement portion 18. The sprocket body can also have a disk-like shape without including arm portions 20 and openings that are each positioned between neighboring arm portions.

The bicycle sprocket S3 comprises a chain engagement structure 22 arranged on a radially outer periphery of the sprocket body 14. In the illustrated embodiment, the chain engagement structure 22 is arranged on a radially outer periphery of the base portion 16. The chain engagement structure 22 includes a plurality of chain-engaging teeth 24. The plurality of chain-engaging teeth 24 are each configured to engage with the bicycle chain C and are arranged in the circumferential direction D1.

The chain engagement structure 22 includes at least one shifting facilitation area 26 and/or 28. The at least one shifting facilitation area 26 and/or 28 is configured to facilitate changing gears. The chain engagement structure 22 includes at least one upshifting facilitation area 26 and at least one downshifting facilitation area 28 as the at least one shifting facilitation area. In the illustrated embodiment, the chain engagement structure 22 includes upshifting facilitation areas 26 and downshifting facilitation areas 28 as the at least one shifting facilitation area. The upshifting facilitation area 26 is configured to facilitate shifting the bicycle chain C from the bicycle sprocket S3 toward a neighboring smaller sprocket. The downshifting facilitation area 28 is configured to facilitate shifting the bicycle chain C toward the bicycle sprocket S3 from the neighboring smaller sprocket. The bicycle sprocket S4 can be also referred to as the neighboring smaller sprocket S4.

Each of the upshifting facilitation areas 26 is configured to facilitate upshifting from the bicycle sprocket S3 to the bicycle sprocket S4. Each of the downshifting facilitation areas 28 is configured to facilitate downshifting from the bicycle sprocket S4 to the bicycle sprocket S3. In the illustrated embodiment, the upshifting facilitation areas 26 and the downshifting facilitation areas 28 are alternatively arranged in the circumferential direction D1. Each of the upshifting facilitation areas 26 are provided between adjacent two of the downshifting facilitation areas 28.

Figure 4:
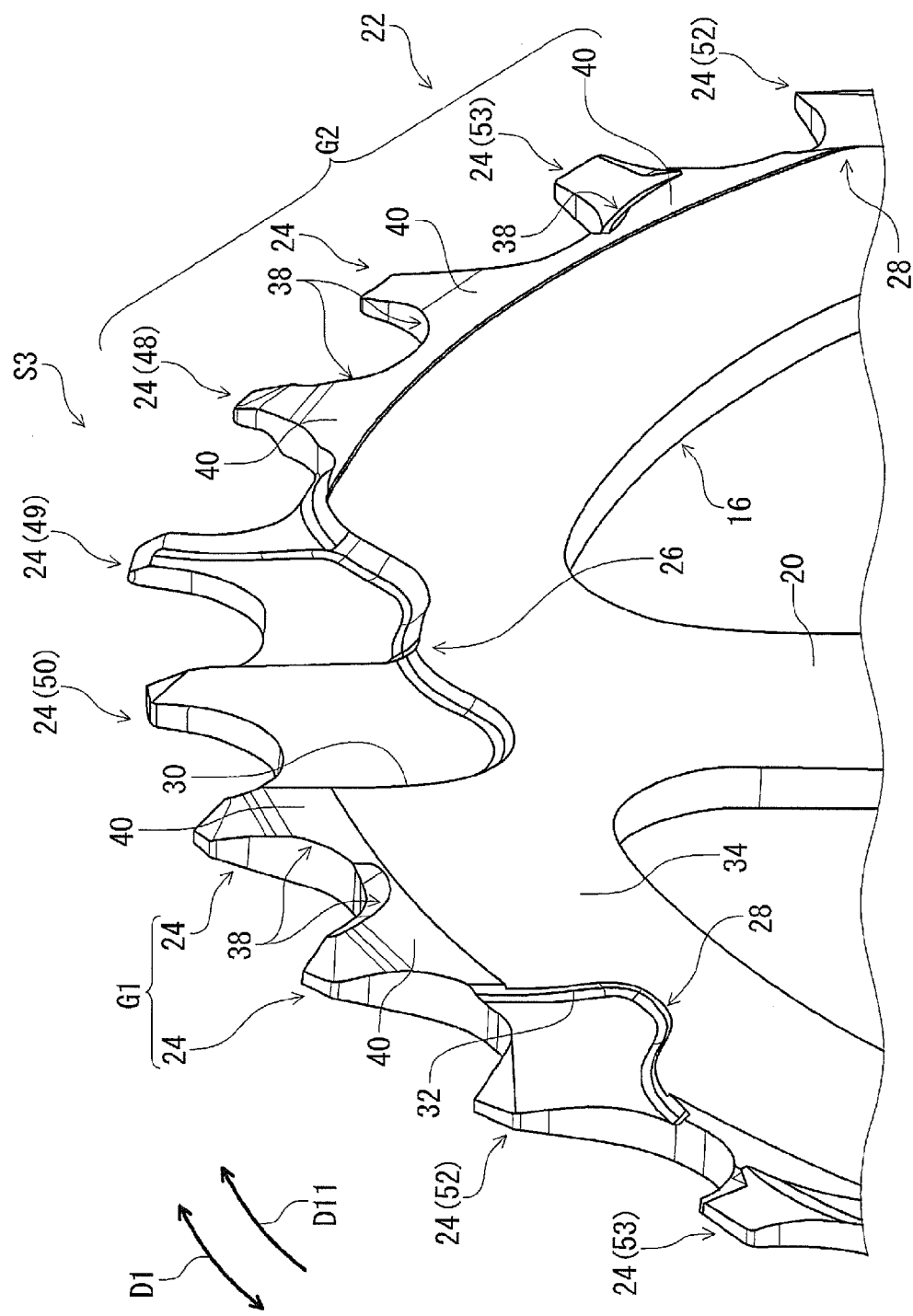
FIG. 4 is a partial perspective view of the bicycle sprocket illustrated in FIG. 3.

As seen in FIG. 4, the at least one shifting facilitation area 26 and/or 28 includes an axially recessed portion. In the illustrated embodiment, each of the upshifting facilitation areas 26 includes an upshifting recessed portion 30 as the axially recessed portion. Each of the downshifting facilitation areas 28 includes a downshifting recessed portion 32 as the axially recessed portion. The upshifting recessed portion 30 is configured to reduce interference between the bicycle chain C and the bicycle sprocket S3 during upshifting from the bicycle sprocket S3 to the bicycle sprocket S4 (FIG. 2). The downshifting recessed portion 32 is configured to reduce interference between the bicycle chain C and the bicycle sprocket S3 during downshifting from the bicycle sprocket S4 (FIG. 2) to the bicycle sprocket S3.

As seen in FIG. 2, the bicycle sprocket S3 includes a first axial side 34 and a second axial side 36 opposite to the first axial side 34 in the axial direction D2. The first axial side 34 is configured to face the bicycle sprocket S4 in the bicycle sprocket assembly 10. The second axial side 36 is configured to face the bicycle sprocket S2 in the bicycle sprocket assembly 10.

As seen in FIG. 4, each of the upshifting recessed portions 30 is provided on the first axial side 34. Each of the downshifting recessed portions 32 is provided on the first axial side 34. More specifically, each of the upshifting recessed portions 30 is at least partially provided on the base portion 16 of the sprocket body 14. Each of the downshifting recessed portions 32 is at least partially provided on the base portion 16 of the sprocket body 14.

Figure 5:
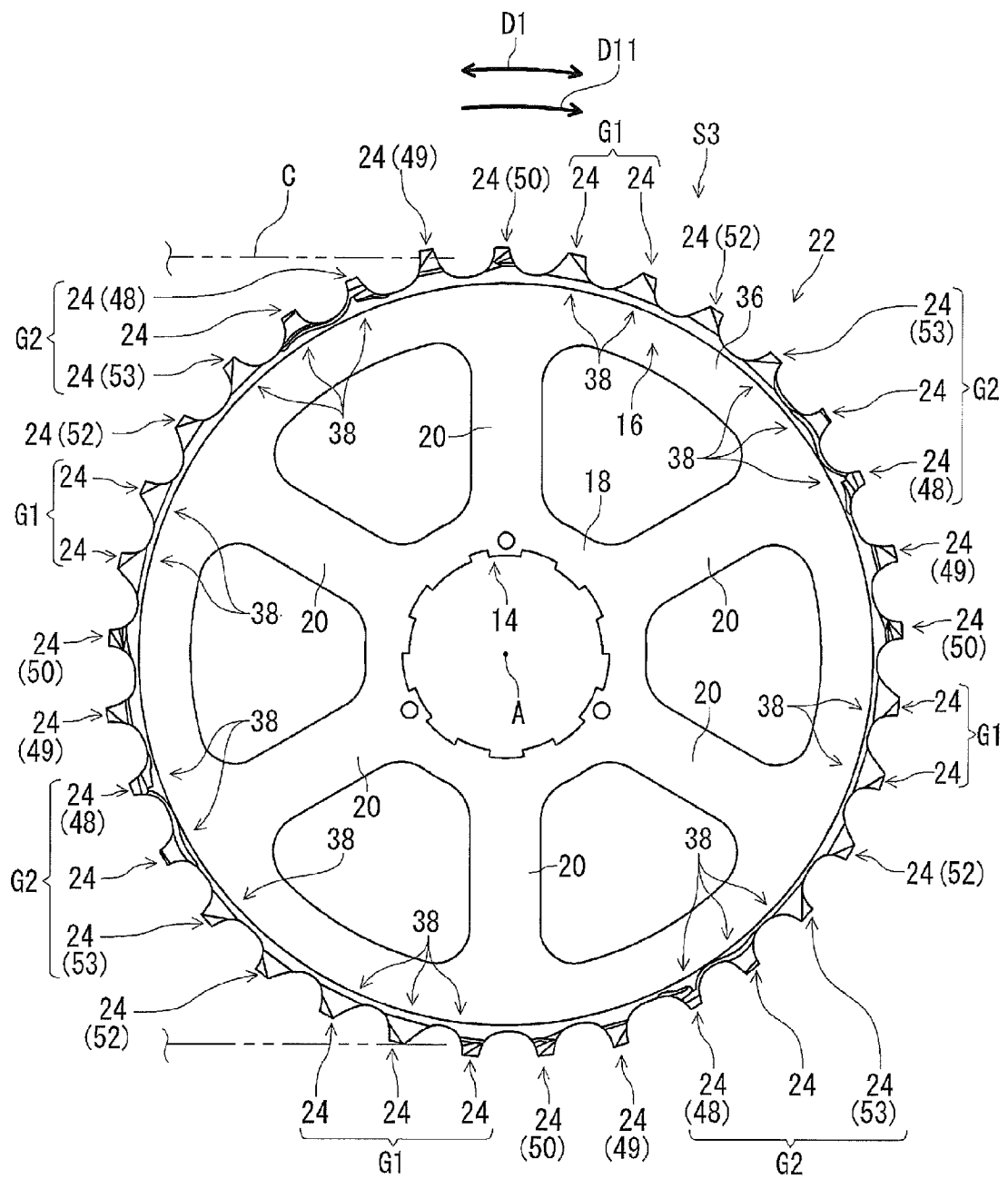
FIG. 5 is a left side elevational view of the bicycle sprocket illustrated in FIG. 3.

As seen in FIG. 5, each of the upshifting recessed portions 30 is not provided on the second axial side 36. Each of the downshifting recessed portions 32 is not provided on the second axial side 36.

As seen in FIG. 3, the plurality of chain-engaging teeth 24 includes at least two neighboring chain-engaging teeth 24 each including a chain-engaging portion 38 configured to engage with the bicycle chain C. In the illustrated embodiment, the plurality of chain-engaging teeth 24 include first chain-engaging groups G1 and second chain-engaging groups G2. Each of the first chain-engaging groups G1 includes neighboring chain-engaging teeth 24 each including the chain-engaging portion 38. Each of the second chain-engaging groups G2 includes neighboring chain-engaging teeth 24 each including the chain-engaging portion 38.

Figure 6:
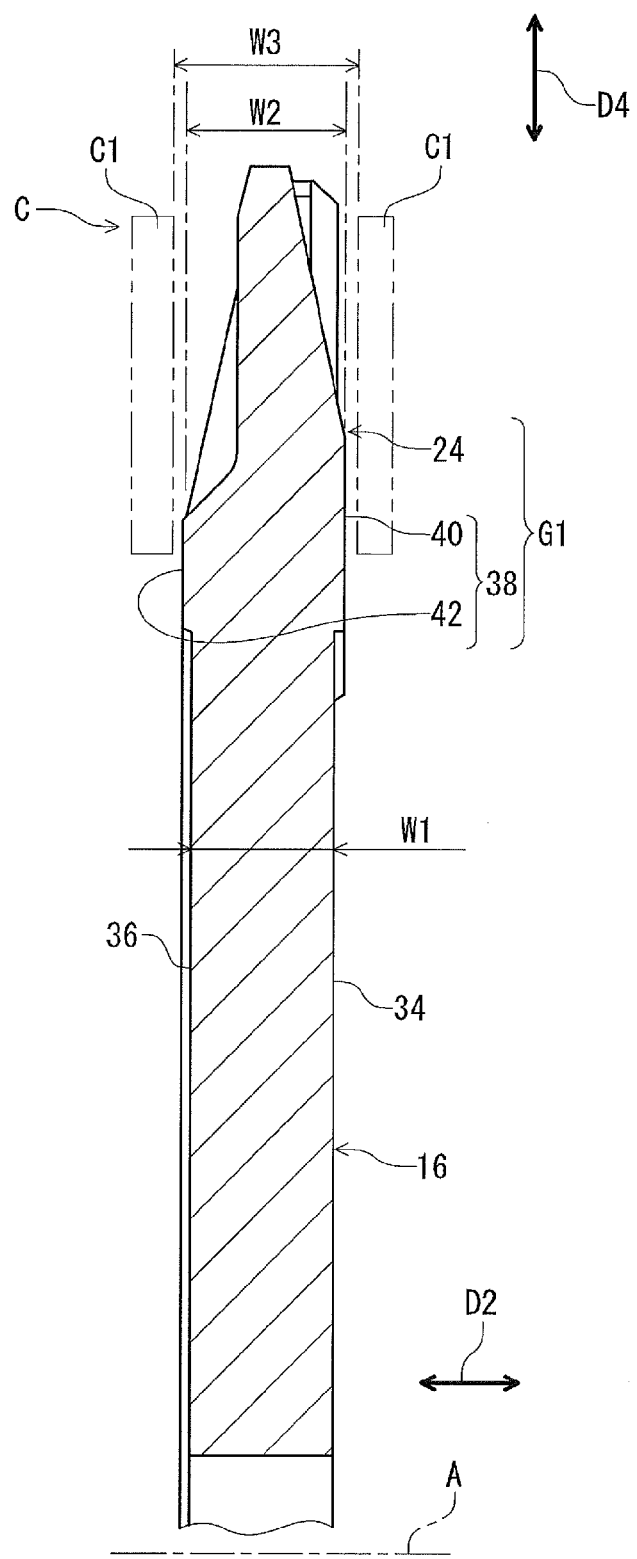
FIG. 6 is a partial cross-sectional view of the bicycle sprocket taken along line VI-VI of FIG. 3.
Figure 7:
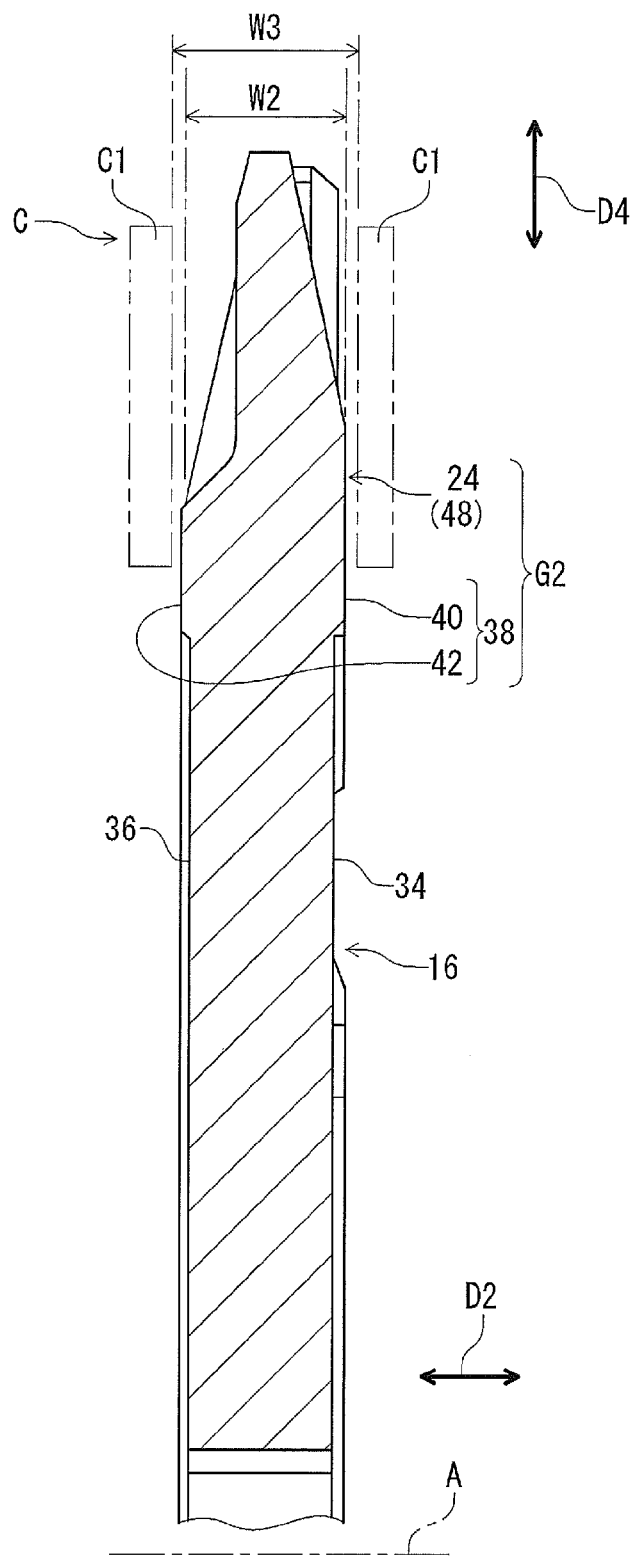
FIG. 7 is a partial cross-sectional view of the bicycle sprocket taken along line VII-VII of FIG. 3.

As seen in FIGS. 6 and 7, in each of the first and second chain-engaging groups G1 and G2, the chain-engaging portion 38 includes a first chain-engaging surface 40 and a second chain-engaging surface 42. In the illustrated embodiment, each of the first chain-engaging surface 40 and the second chain-engaging surface 42 is a flat surface. Each of the first chain-engaging surface 40 and the second chain-engaging surface 42 is configured to face in the axial direction D2. Each of the first chain-engaging surface 40 and the second chain-engaging surface 42 extends substantially perpendicularly relative to the axial direction D2.

The chain-engaging portion 38 is configured to partly engage with a link plate C1 of the bicycle chain C in a radial direction D4 of the bicycle sprocket S3. In the illustrated embodiment, the chain-engaging portion 38 is contactable with the link plate C1 (an inner link plate in FIGS. 6 and 7) of the bicycle chain C. The chain-engaging portion 38 is configured to face the link plate C1 in the axial direction D2.

As seen in FIG. 4, the first chain-engaging surfaces 40 are provided on the first axial side 34. In each of the first and second chain-engaging groups G1 and G2, the first chain-engaging surfaces 40 are connected with each other to provide one flat surface in the illustrated embodiment. The first chain-engagement surfaces 40 may also be divided into a plurality of flat surfaces.

Figure 8:
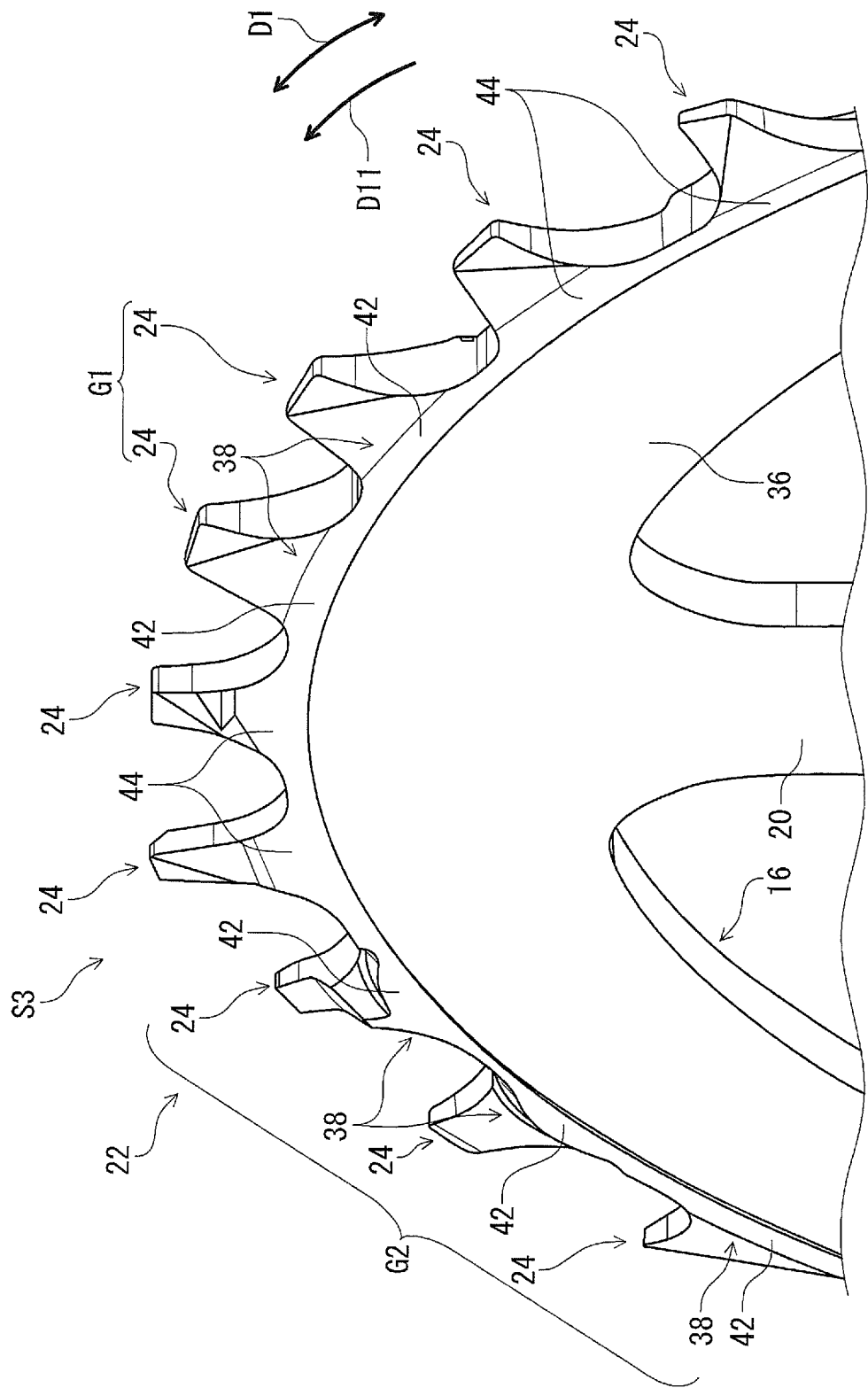
FIG. 8 is a partial perspective view of the bicycle sprocket illustrated in FIG. 3.

As seen in FIG. 8, the second chain-engaging surfaces 42 are provided on the second axial side 36. In each of the first and second chain-engaging groups G1 and G2, the second chain-engaging surfaces 42 are connected with each other to provide one flat surface. The second chain-engagement surfaces 42 may also be divided into a plurality of flat surfaces. The chain-engaging teeth 24 other than the first and second chain-engaging groups G1 and G2 each include a slidable surface 44. The second chain-engaging surfaces 42 and the slidable surfaces 44 are connected with each other to provide one annular flat surface in the illustrated embodiment (FIG. 5 and FIG. 8). The second chain-engaging surfaces 42 and the slidable surfaces 44 may also be divided into a plurality of flat surfaces.

Figure 9:
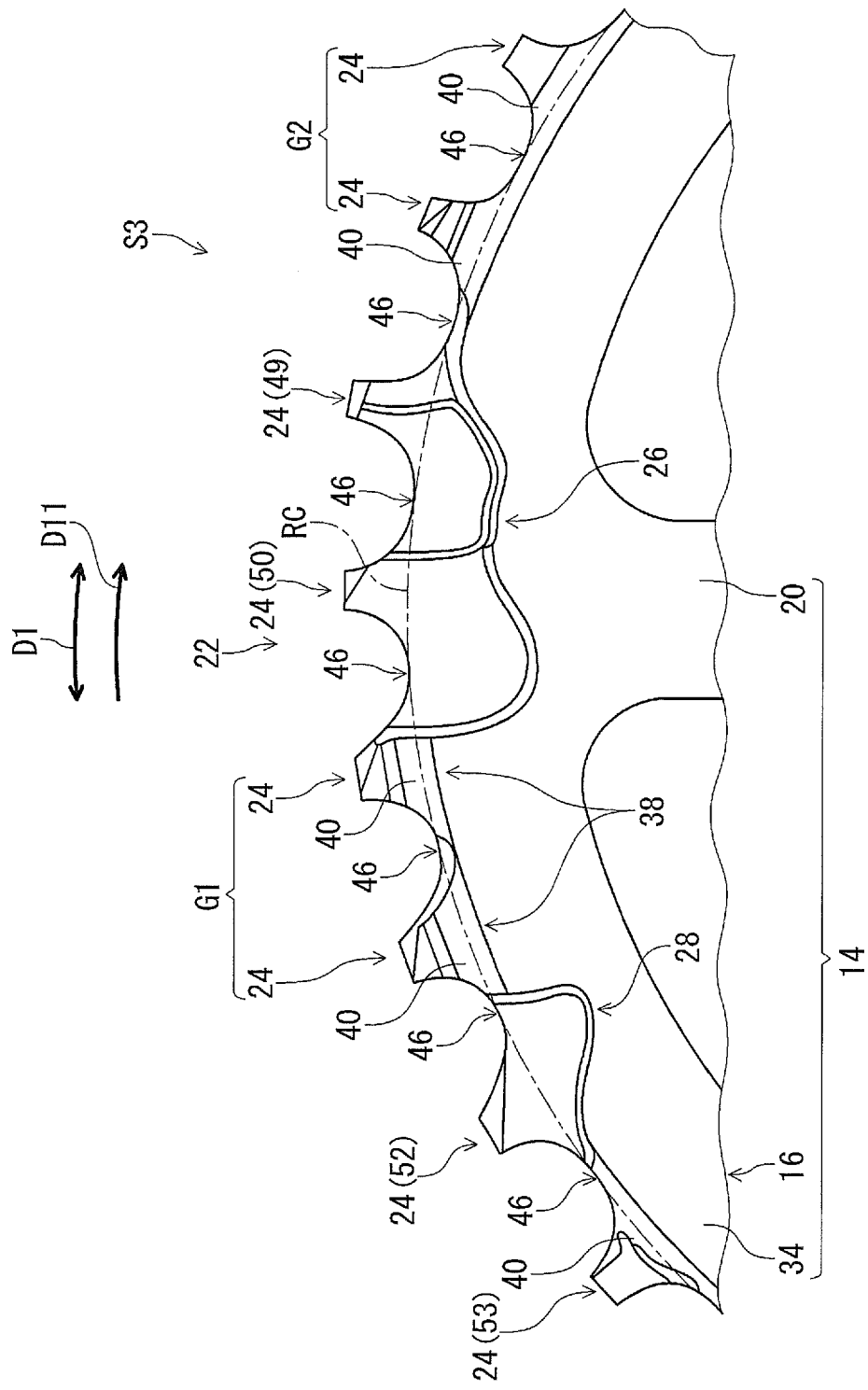
FIG. 9 is a right side partial elevational view of the bicycle sprocket illustrated in FIG. 3.

As seen in FIG. 9, the sprocket teeth 24 include tooth bottoms 46 defining a root circle RC. The radially outer periphery of the sprocket body 14 (the radially outer periphery of the base portion 16) corresponds to the root circle RC. The root circle RC is disposed on each of the first chain-engaging surfaces 40 when viewed from the axial direction D2 (a direction perpendicular to a paper surface of FIG. 9).

Figure 10:
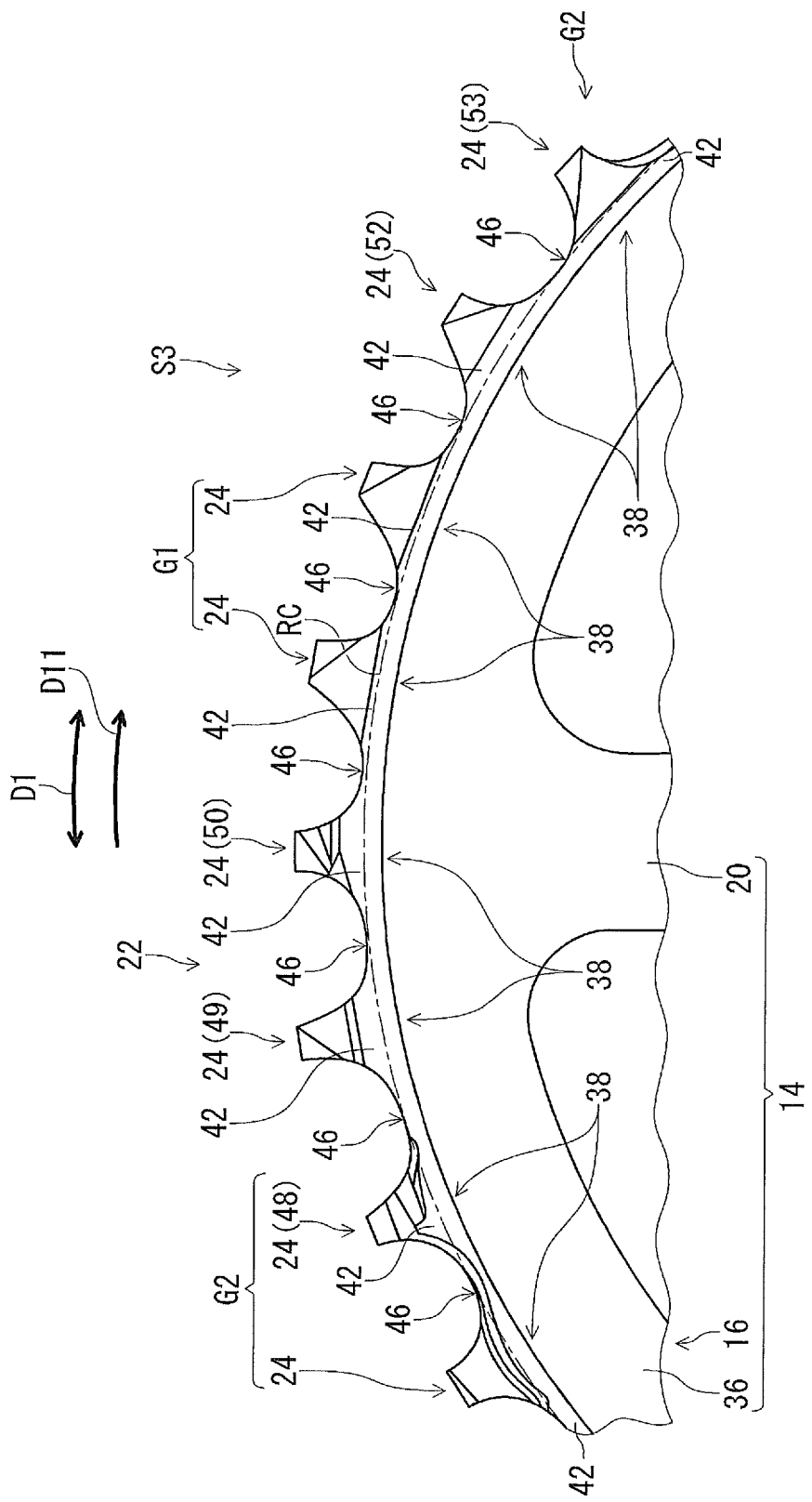
FIG. 10 is a left side partial elevational view of the bicycle sprocket illustrated in FIG. 3.

As seen in FIG. 10, the root circle RC is disposed on each of the second chain-engaging surfaces 42 when viewed from the axial direction D2 (a direction perpendicular to a paper surface of FIG. 10).

As seen in FIG. 3, the plurality of chain-engaging teeth 24 include at least one upshifting facilitation tooth configured to facilitate shifting the bicycle chain C from the bicycle sprocket S3 toward a neighboring smaller sprocket. The bicycle sprocket S4 can be also referred to as the neighboring smaller sprocket S4. In the illustrated embodiment, the plurality of chain-engaging teeth 24 include upshifting facilitation teeth 49 and 50 as the at least one upshifting tooth. Each of the upshifting facilitation teeth 49 and 50 is configured to facilitate shifting the bicycle chain C from the bicycle sprocket S3 to the neighboring smaller sprocket S4 (FIG. 2).

The plurality of chain-engaging teeth 24 include at least one downshifting facilitation tooth configured to facilitate shifting the bicycle chain C toward the bicycle sprocket S3 from the neighboring smaller sprocket. In the illustrated embodiment, the plurality of chain-engaging teeth 24 includes downshifting facilitation teeth 52 as the at least one downshifting facilitation tooth. Each of the downshifting facilitation teeth 52 is configured to facilitate shifting the bicycle chain C toward the bicycle sprocket S3 from the neighboring smaller sprocket S4 (FIG. 2).

As seen in FIGS. 1 and 2, the neighboring smaller sprocket S4 is adjacent to the bicycle sprocket S3 without another sprocket and has a total number of teeth less than a total number of the plurality of chain-engaging teeth 24.

Figure 11:
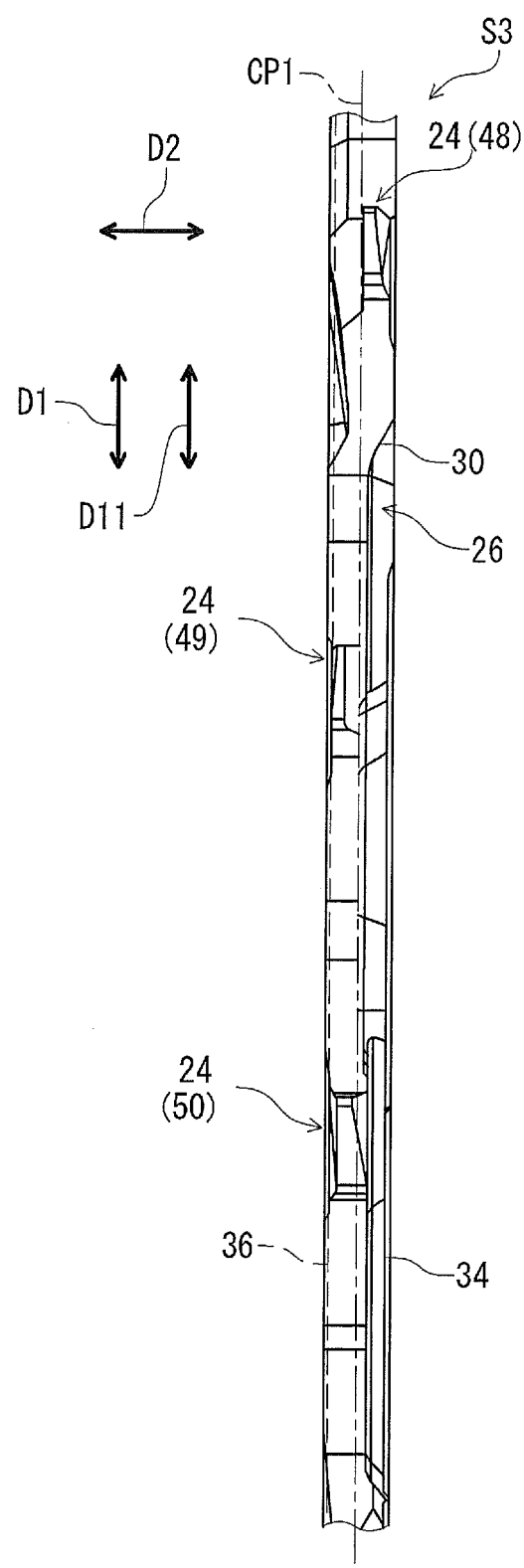
FIG. 11 is a partial edge elevational view of the bicycle sprocket illustrated in FIG. 3.

As seen in FIG. 3, the plurality of chain-engaging teeth 24 includes teeth 48. As seen in FIG. 11, the tooth 48 is offset with respect to an axial center plane CP1 of the bicycle sprocket S3 toward the first axial side 34. The upshifting facilitation teeth 49 and 50 are offset with respect to the axial center plane CP1 toward the second axial side 36. The upshifting recessed portion 30 causes the upshifting facilitation teeth 49 and 50 to be offset with respect to the axial center plane CP1 toward the second axial side 36. As seen in FIG. 3, the tooth 48 is adjacent to the upshifting facilitation area 26. The upshifting facilitation teeth 49 and 50 are provided in the upshifting facilitation area 26.

The offset arrangement of the tooth 48 allows the bicycle chain C to be offset with respect to the axial center plane CP1 toward the neighboring smaller sprocket S4 (FIG. 2) in the axial direction D2. The upshifting facilitation teeth 49 and 50 are arranged to catch the bicycle chain C (FIG. 1) in a state where the bicycle chain C is positioned closer to the second axial side 36 without engaging with the bicycle sprocket S3. The upshifting facilitation teeth 49 and 50 are also arranged to facilitate disengagement of the bicycle chain C (FIG. 1) from the bicycle sprocket S3 in a state where the bicycle chain C engaging with the bicycle sprocket S3 is offset toward the neighboring smaller sprocket S4 in the axial direction D2.

Figure 12:
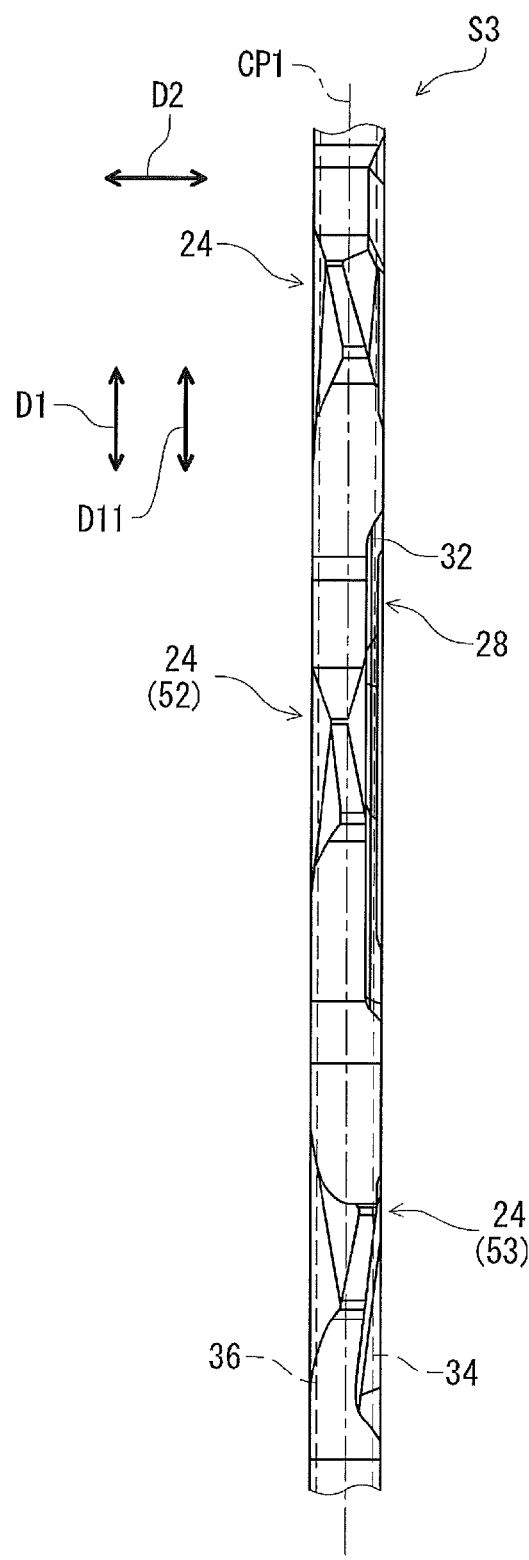
FIG. 12 is a partial edge elevational view of the bicycle sprocket illustrated in FIG. 3.

As seen in FIG. 12, the downshifting facilitation tooth 52 is offset with respect to the axial center plane CP1 of the bicycle sprocket S3 toward the second axial side 36. The tooth 53 is offset with respect to the axial center plane CP1 toward the first axial side 34. The downshifting recessed portion 32 causes the downshifting facilitation tooth 52 to be offset with respect to the axial center plane CP1 toward the second axial side 36. As seen in FIG. 3, the downshifting facilitation tooth 52 is provided in the downshifting facilitation area 28. The tooth 53 is adjacent to the downshifting facilitation area 28.

The offset arrangement of the downshifting facilitation tooth 52 allows, during downshifting to the bicycle sprocket S3, the bicycle chain C to be positioned closer to the second axial side 36 of the bicycle sprocket S3 in the axial direction D2 with reducing interference between the bicycle chain C and the bicycle sprocket S3. The tooth 53 is arranged to catch the bicycle chain C in a state where the bicycle chain C is positioned closer to the bicycle sprocket S3 without engaging with the bicycle sprocket S3.

As seen in FIGS. 6 and 7, the sprocket body 14 has an axial width W1 defined in the axial direction D2 parallel to the rotational center axis A. The chain-engaging portion 38 has an axial chain-engaging width W2 defined in the axial direction D2. The axial chain-engaging width W2 is larger than the axial width W1 of the sprocket body 14.

The axial width W1 is defined between the first axial side 34 and the second axial side 36 in the axial direction D2. Namely, in the illustrated embodiment, the axial width W1 of the sprocket body 14 is defined as a thickness of the base portion 16. In each of the first and second chain-engaging groups G1 and G2, the axial chain-engaging width W2 is defined between the first chain-engaging surface 40 and the second chain-engaging surface 42 in the axial direction D2.

As seen in FIGS. 6 and 7, the axial chain-engaging width W2 is smaller than an axial inner distance W3 defined between opposed inner link plates of the bicycle chain C in the axial direction D2. A difference between the axial chain-engaging width W2 and the axial inner distance W3 is preferably equal to or smaller than 0.2 mm in the axial direction D2. The difference between the axial chain-engaging width W2 and the axial inner distance W3 is preferably equal to or larger than 0.1 mm in the axial direction D2. The difference between the axial chain-engaging width W2 and the axial inner distance W3 can be equal to or smaller than approximately 0.2 mm in the axial direction D2. The difference between the axial chain-engaging width W2 and the axial inner distance W3 can be equal to or larger than approximately 0.1 mm in the axial direction D2.

With the bicycle sprocket S3, the at least one shifting facilitation area 26 and/or 28 is configured to facilitate shifting the bicycle chain C for changing gears. Furthermore, since the axial chain-engaging width W2 of the chain-engaging portion 38 is larger than the axial width W1 of the sprocket body 14, it is possible to reduce a clearance between the chain-engaging portion 38 and the link plates C1 of the bicycle chain C with saving weight of the bicycle sprocket S3. The reducing of the clearance can prevent the bicycle chain C from unintentionally disengaging from the bicycle sprocket S3. Namely, it is possible to prevent the bicycle chain C from unintentionally disengaging from the bicycle sprocket S3 with saving weight of the bicycle sprocket S3.

Since other bicycle sprockets S1, S2 and S4 to S10 each have substantially the same structure as that of the bicycle sprocket S3, the bicycle sprockets S1, S2 and S4 to S10 each enable the same advantageous effect as that of the bicycle sprocket S3.

Similarly, since the structure of the bicycle sprocket S3 is applied to the bicycle sprocket assembly 10, it is possible to prevent the bicycle chain C from unintentionally disengaging from the bicycle sprocket assembly 10 with saving weight of the bicycle sprocket S3.

In addition to the above structures of the bicycle sprockets, the bicycle sprocket assembly 10 has features described below. The features of the bicycle sprocket assembly 10 will be described in detail below referring to FIGS. 1 and 13 to 17. Elements having substantially the same function as those in the bicycle sprocket S3 described above will be numbered the same here, and will not be described again in detail here for the sake of brevity.

In the illustrated embodiment, the bicycle sprocket S1 can be referred to as a first sprocket S1. The bicycle sprocket S10 can be referred to as a second sprocket S10. The bicycle sprocket S2 can be referred to as a third sprocket S2. The bicycle sprocket S9 can be referred to as a fourth sprocket S9. Other bicycle sprockets can be respectively referred to as the first to fourth bicycle sprockets. For example, the bicycle sprockets S10 and S11 can be referred to as third and fourth sprockets, respectively.

As seen in FIG. 1, the bicycle sprocket assembly 10 comprises the first sprocket S1, the second sprocket S10, the third sprocket S2, and the fourth sprocket S9. The third sprocket S2 is positioned between the first sprocket S1 and the second sprocket S10 in the axial direction D2 and adjacent to the first sprocket S1 without another sprocket. The fourth sprocket S9 is positioned between the second sprocket S10 and the third sprocket S2 in the axial direction D2 and adjacent to the second sprocket S10 without another sprocket.

Figure 13:
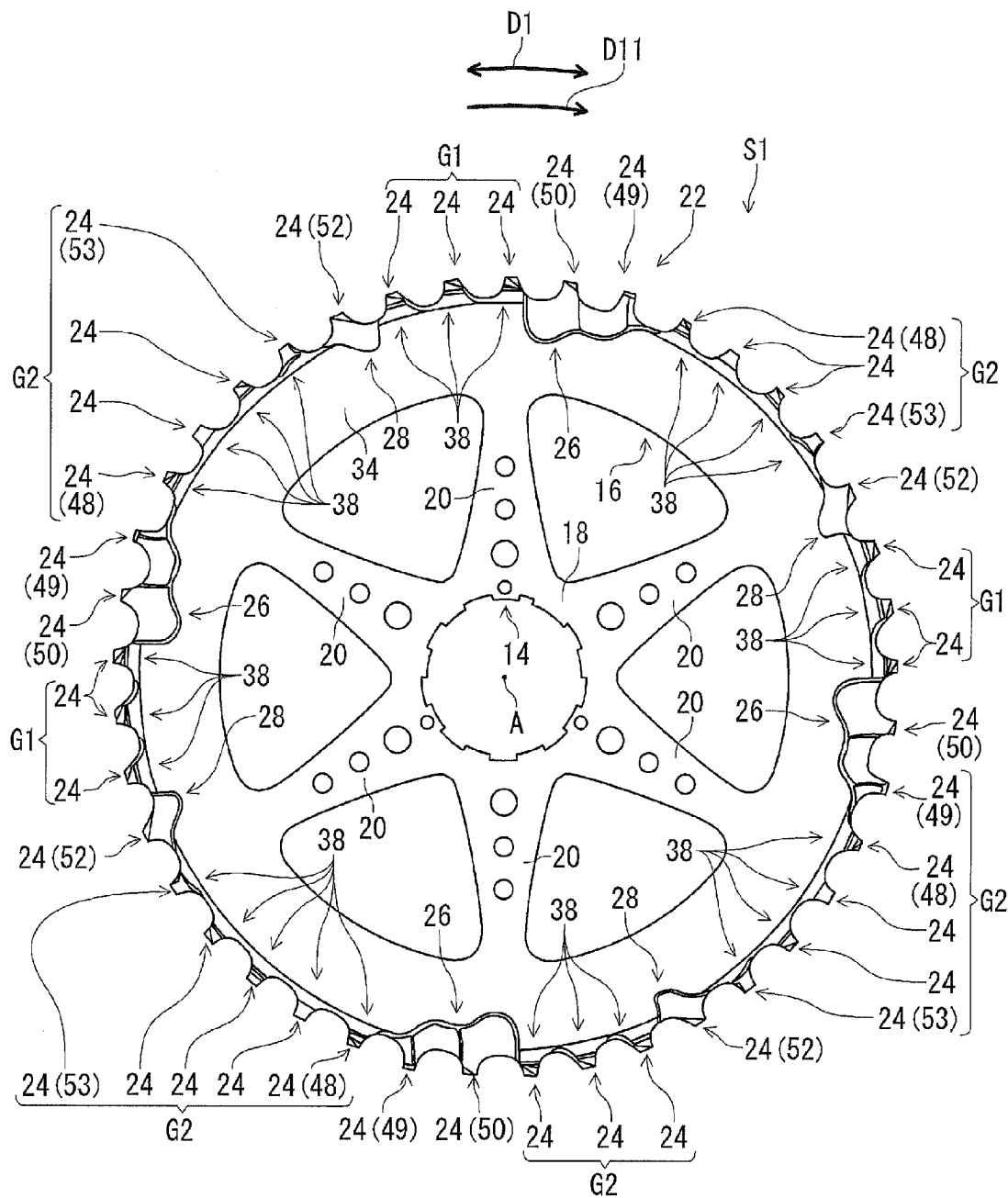
FIG. 13 is a right side elevational view of a bicycle sprocket of the bicycle sprocket assembly illustrated in FIG. 1.

As seen in FIG. 13, the first sprocket S1 includes a first sprocket body 14 and a first chain engagement structure 22. The first chain engagement structure 22 is arranged on a radially outer periphery of the first sprocket body 14. The first chain engagement structure 22 includes at least one first shifting facilitation area 26 and/or 28 and a plurality of first chain-engaging teeth 24.

The at least one first shifting facilitation area 26 and/or 28 is configured to facilitate changing gears. At least one of the plurality of first chain-engaging teeth 24 includes a first chain-engaging portion 38 configured to engage with the bicycle chain C. In the illustrated embodiment, each of at least two neighboring first chain-engaging teeth 24 includes the first chain-engaging portion 38.

Figure 14:
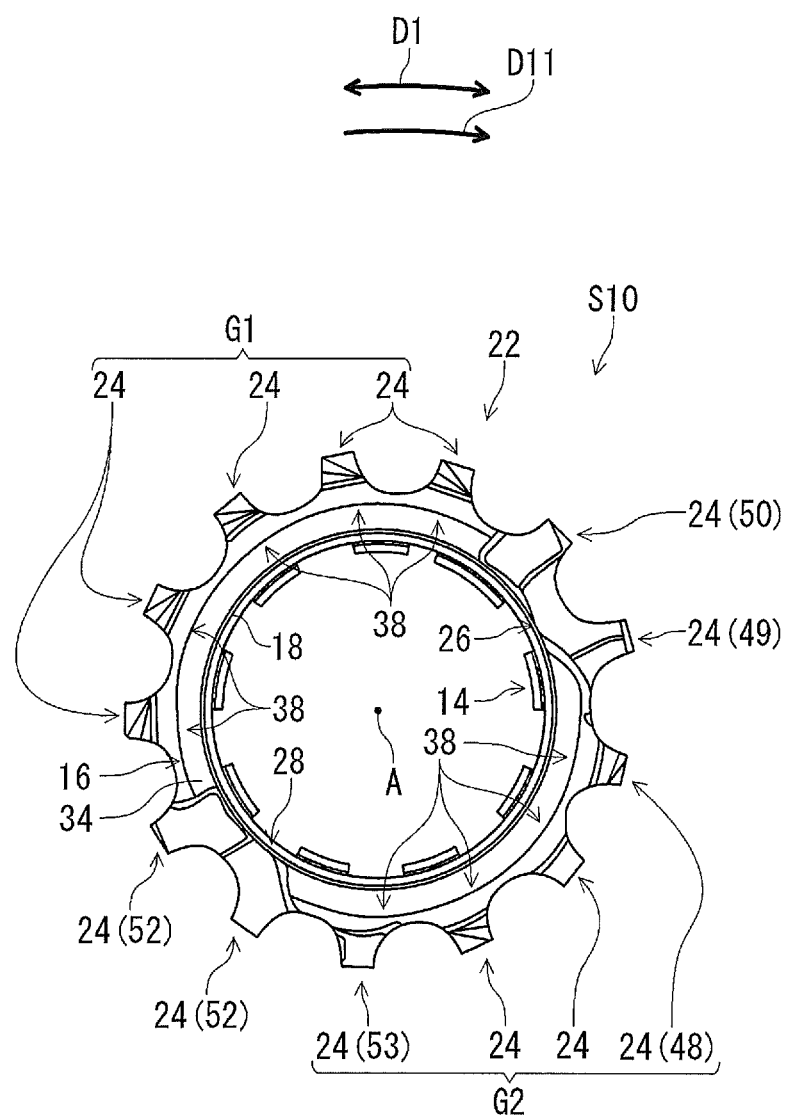
FIG. 14 is a right side elevational view of a bicycle sprocket of the bicycle sprocket assembly illustrated in FIG. 1.

As seen in FIG. 14, the second sprocket S10 includes a second sprocket body 14 and a second chain engagement structure 22. The second chain engagement structure 22 is arranged on a radially outer periphery of the second sprocket body 14. The second chain engagement structure 22 includes at least one second shifting facilitation area 26 and/or 28 and a plurality of second chain-engaging teeth 24.

The at least one second shifting facilitation area 26 and/or 28 is configured to facilitate changing gears. At least one of the plurality of second chain-engaging teeth 24 includes a second chain-engaging portion 38 configured to engage with the bicycle chain C. In the illustrated embodiment, each of at least two neighboring second chain-engaging teeth 24 includes the second chain-engaging portion 38.

As seen in FIGS. 13 and 14, a total number of the plurality of second chain-engaging teeth 24 is smaller than a total number of the plurality of first chain-engaging teeth 24.

Figure 15:
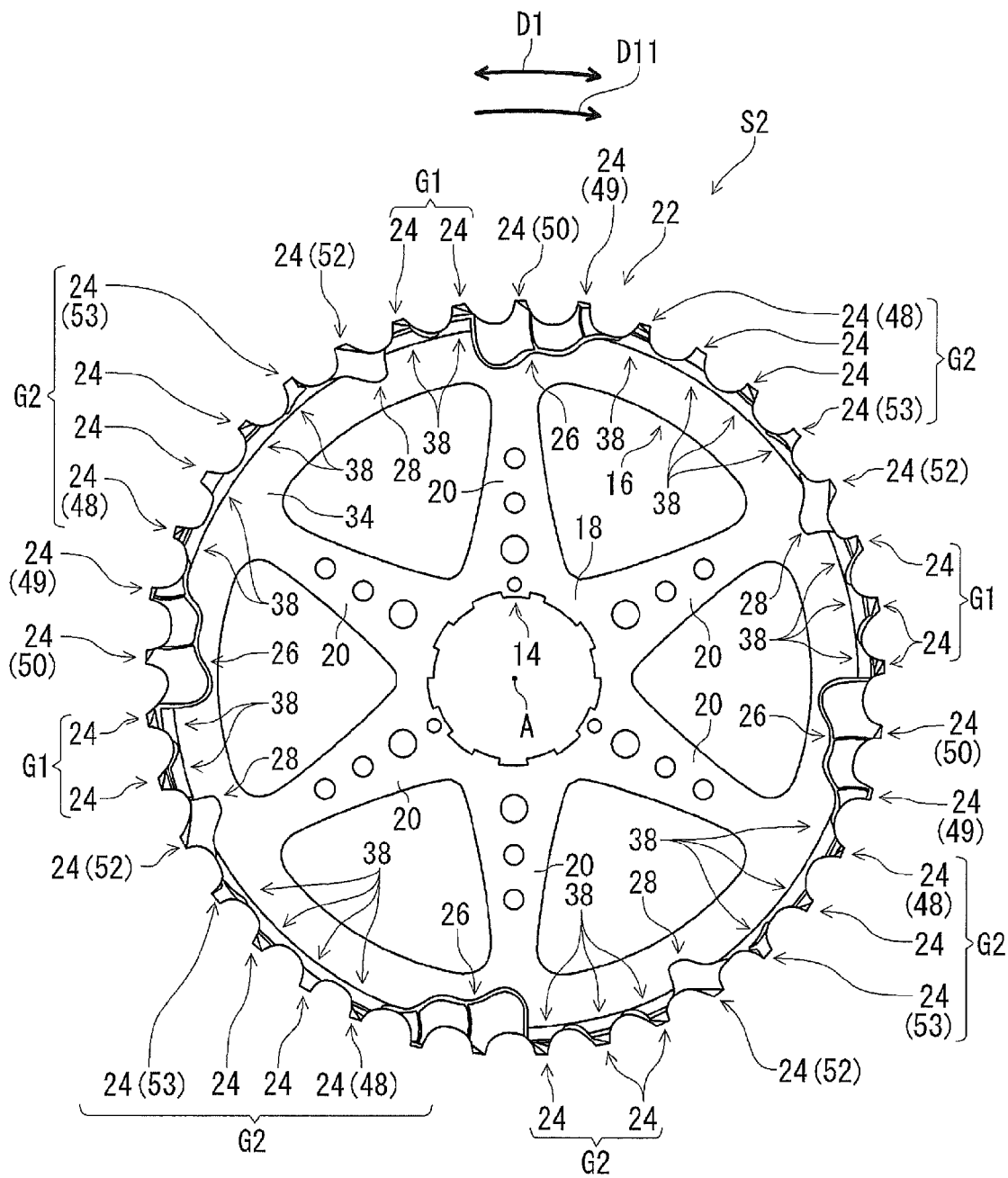
FIG. 15 is a right side elevational view of a bicycle sprocket of the bicycle sprocket assembly illustrated in FIG. 1.

As seen in FIG. 15, the third sprocket S2 includes a third sprocket body 14 and a third chain engagement structure 22. The third chain engagement structure 22 is arranged on a radially outer periphery of the third sprocket body 14. The third chain engagement structure 22 includes at least one third shifting facilitation area 26 and/or 28 and a plurality of third chain-engaging teeth 24.

The at least one third shifting facilitation area 26 and/or 28 is configured to facilitate changing gears. At least one of the plurality of third chain-engaging teeth 24 includes a third chain-engaging portion 38 configured to engage with the bicycle chain C. In the illustrated embodiment, each of at least two neighboring third chain-engaging teeth 24 includes the third chain-engaging portion 38.

As seen in FIGS. 13 to 15, a total number of the plurality of third chain-engaging teeth is smaller than the total number of the plurality of first chain-engaging teeth 24 and larger than the total number of the plurality of second chain-engaging teeth 24.

Figure 16:
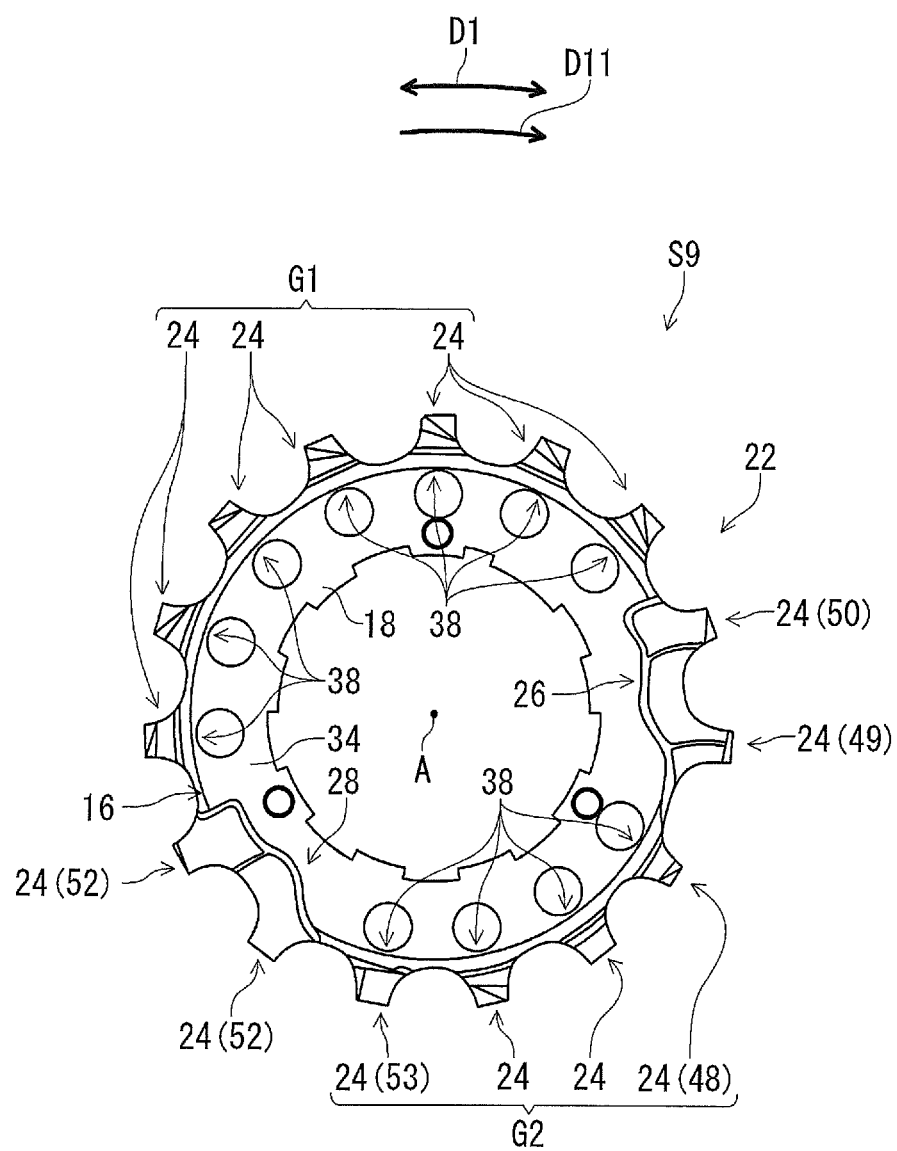
FIG. 16 is a right side elevational view of a bicycle sprocket of the bicycle sprocket assembly illustrated in FIG. 1.

As seen in FIG. 16, the fourth sprocket S9 includes a fourth sprocket body 14 and a fourth chain engagement structure 22. The fourth chain engagement structure 22 is arranged on a radially outer periphery of the fourth sprocket body 14. The fourth chain engagement structure 22 includes at least one fourth shifting facilitation area 26 and/or 28 and a plurality of fourth chain-engaging teeth 24.

The at least one fourth shifting facilitation area 26 and/or 28 is configured to facilitate changing gears. At least one of the plurality of fourth chain-engaging teeth 24 includes a fourth chain-engaging portion 38 configured to engage with the bicycle chain C. In the illustrated embodiment, each of at least two neighboring fourth chain-engaging teeth 24 includes the fourth chain-engaging portion 38.

As seen in FIGS. 14 to 16, a total number of the plurality of fourth chain-engaging teeth 24 is smaller than the total number of the plurality of third chain-engaging teeth 24 and larger than the total number of the plurality of second chain-engaging teeth 24.

Figure 17:
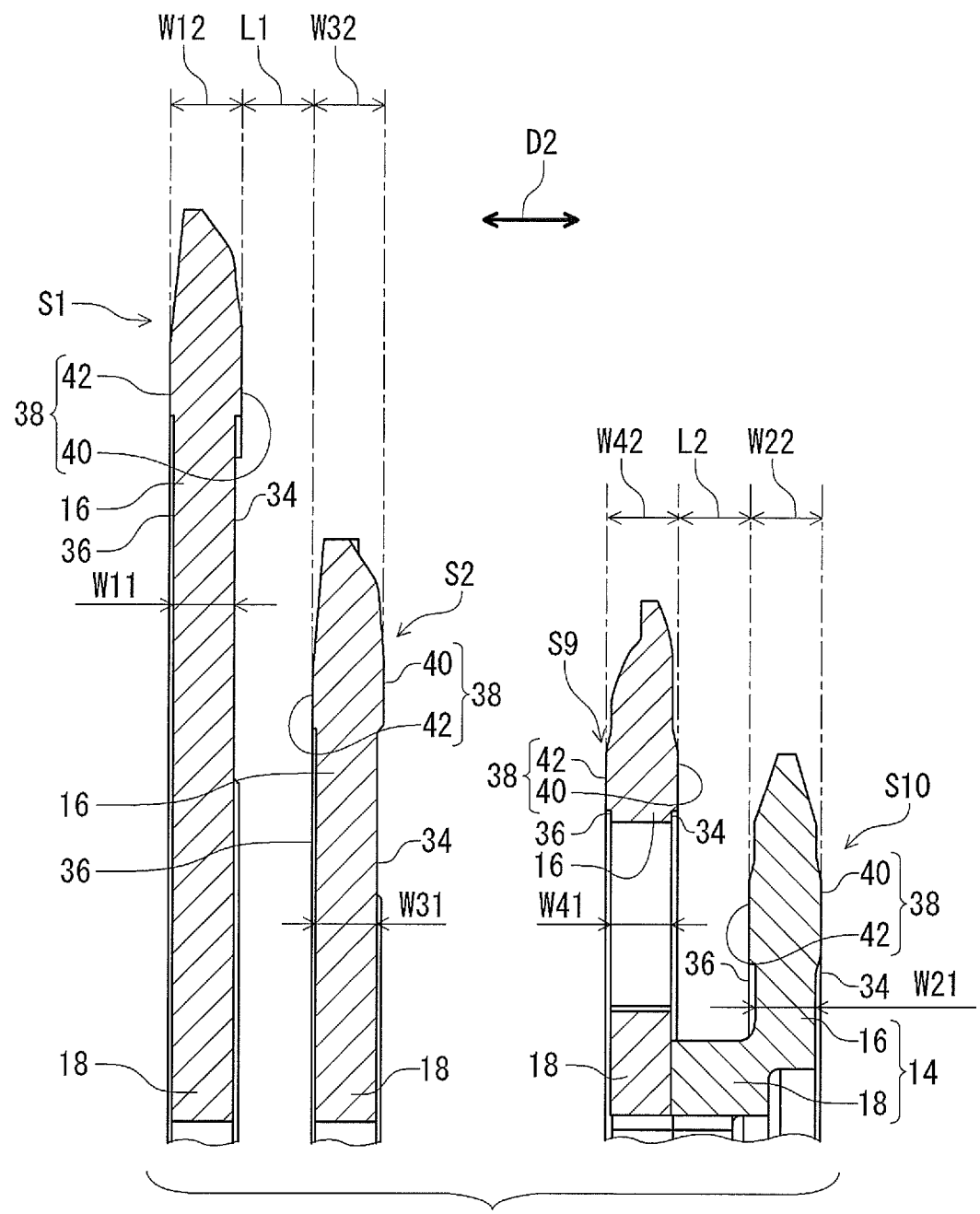
FIG. 17 is a partial cross-sectional view of the bicycle sprockets illustrated in FIGS. 13 to 16.

As seen in FIG. 17, in the first sprocket S1, the first sprocket body 14 has a first axial width W11 defined in the axial direction D2. The first chain-engaging portion 38 has a first axial chain-engaging width W12 defined in the axial direction D2 parallel to the rotational center axis A. The first axial chain-engaging width W12 is larger than the first axial width W11 of the first sprocket body 14. In the illustrated embodiment, the first axial width W11 is defined between the first axial side 34 and the second axial side 36 in the first sprocket S1. The first axial chain-engaging width W12 is defined between the first chain-engaging surface 40 and the second chain-engaging surface 42 in the first sprocket S1.

In the second sprocket S10, the second sprocket body 14 has a second axial width W21 defined in the axial direction D2. The second chain-engaging portion 38 has a second axial chain-engaging width W22 defined in the axial direction D2. The second axial chain-engaging width W22 is larger than the second axial width W21 of the second sprocket body 14. In the illustrated embodiment, the second axial width W21 is defined between the first axial side 34 and the second axial side 36 in the second sprocket S10. The second axial chain-engaging width W22 is defined between the first chain-engaging surface 40 and the second chain-engaging surface 42 in the second sprocket S10.

The first axial chain-engaging width W12 is different from the second axial chain-engaging width W22. The second axial chain-engaging width W22 is larger than the first axial chain-engaging width W12. In the illustrated embodiment, for example, the first axial chain-engaging width W12 is 1.84 mm, and the second axial chain-engaging width W22 is 2.1 mm.

Preferable axial chain-engaging widths are different in accordance with a sprocket specification such as a total number of the plurality of chain-engaging teeth or an outer diameter. With the bicycle sprocket assembly 10, since the first axial chain-engaging width W12 is different from the second axial chain-engaging width W21, it is possible to change axial chain-engaging widths in accordance with a sprocket specification of the bicycle sprocket. This can prevent the bicycle chain C from unintentionally disengaging from the bicycle sprocket S1 or S10. Especially, a smaller sprocket tends to unintentionally disengage from a bicycle sprocket more than a larger sprocket. Therefore, it is preferable to widen the axial chain-engaging width of a smaller sprocket more than the axial chain-engaging sprocket of a larger sprocket.

As seen in FIG. 17, in the third sprocket S2, the third sprocket body 14 has a third axial width W31 defined in the axial direction D2. The third chain-engaging portion 38 has a third axial chain-engaging width W32 defined in the axial direction A1. The third axial chain-engaging width W32 is larger than the third axial width W31 of the third sprocket body 14. In the illustrated embodiment, the third axial width W31 is defined between the first axial side 34 and the second axial side 36 in the third sprocket S2. The third axial chain-engaging width W32 is defined between the first chain-engaging surface 40 and the second chain-engaging surface 42 in the third sprocket S2.

In the fourth sprocket S9, the fourth sprocket body 14 has a fourth axial width W41 defined in the axial direction D2. The fourth chain-engaging portion 38 has a fourth axial chain-engaging width W42 defined in the axial direction A1. The fourth axial chain-engaging width W42 is larger than the fourth axial width W41 of the fourth sprocket body 14. In the illustrated embodiment, the fourth axial width W41 is defined between the first axial side 34 and the second axial side 36 in the fourth sprocket S9. The fourth axial chain-engaging width W42 is defined between the first chain-engaging surface 40 and the second chain-engaging surface 42 in the fourth sprocket S9.

As seen in FIG. 17, the first chain-engaging portion 38 of the first chain-engaging tooth 24 is apart from the third chain-engaging portion 38 of the third chain-engaging tooth 24 by a first axial distance L1 defined in the axial direction D2. The second chain-engaging portion 38 of the second chain-engaging tooth 24 is apart from the fourth chain-engaging portion 38 of the fourth chain-engaging tooth 24 by a second axial distance L2 defined in the axial direction D2. The first axial distance L1 is different from the second axial distance L2. The second axial distance L2 is larger than the first axial distance L1.

In the illustrated embodiment, the first axial distance L1 is defined between the first chain-engaging surface 40 of the first sprocket S1 and the second chain-engaging surface 42 of the third sprocket S2 in the axial direction D2. The second axial distance L2 is defined between the first chain-engaging surface 40 of the fourth sprocket S9 and the second chain-engaging surface 42 of the second sprocket S10 in the axial direction D2.

Preferable axial distances between adjacent sprockets are different in accordance with a sprocket specification such as a total number of the plurality of chain-engaging teeth or an outer diameter. For example, the first axial distance L1 has a preferable value for the smooth upshifting and/or downshifting between the first sprocket S1 and the third sprocket S2 in accordance with the total number of the sprocket teeth 24 of each of the first sprocket S1 and the third sprocket S2. Similarly, the second axial distance L2 has a preferable value for the smooth upshifting and/or downshifting between the fourth sprocket S9 and the second sprocket S10 in accordance with the total number of the sprocket teeth 24 of each of the fourth sprocket S9 and the second sprocket S10. Especially, it is preferable to design an axial distance between neighboring smaller sprockets to be larger than an axial distance between neighboring larger sprockets so as to prevent a bicycle chain from being excessively inflected between the neighboring smaller sprockets due to the smaller diameter of each of the neighboring smaller sprockets.

With the bicycle sprocket assembly 10, since the first axial distance L1 is different from the second axial distance L2, it is possible to change axial distances in accordance with specifications of the bicycle sprockets. This can prevent the bicycle chain C from unintentionally disengaging from the bicycle sprocket S1, S2, S9 or S10.

Second Embodiment

A bicycle sprocket S23 in accordance with a second embodiment will be described below referring to FIG. 18. The bicycle sprocket S23 has the same configuration as the bicycle sprocket S3 except for the shifting facilitation areas 26 and 28. Elements having substantially the same function as those in the first embodiment will be numbered the same here, and will not be described again in detail here for the sake of brevity.

Figure 18:
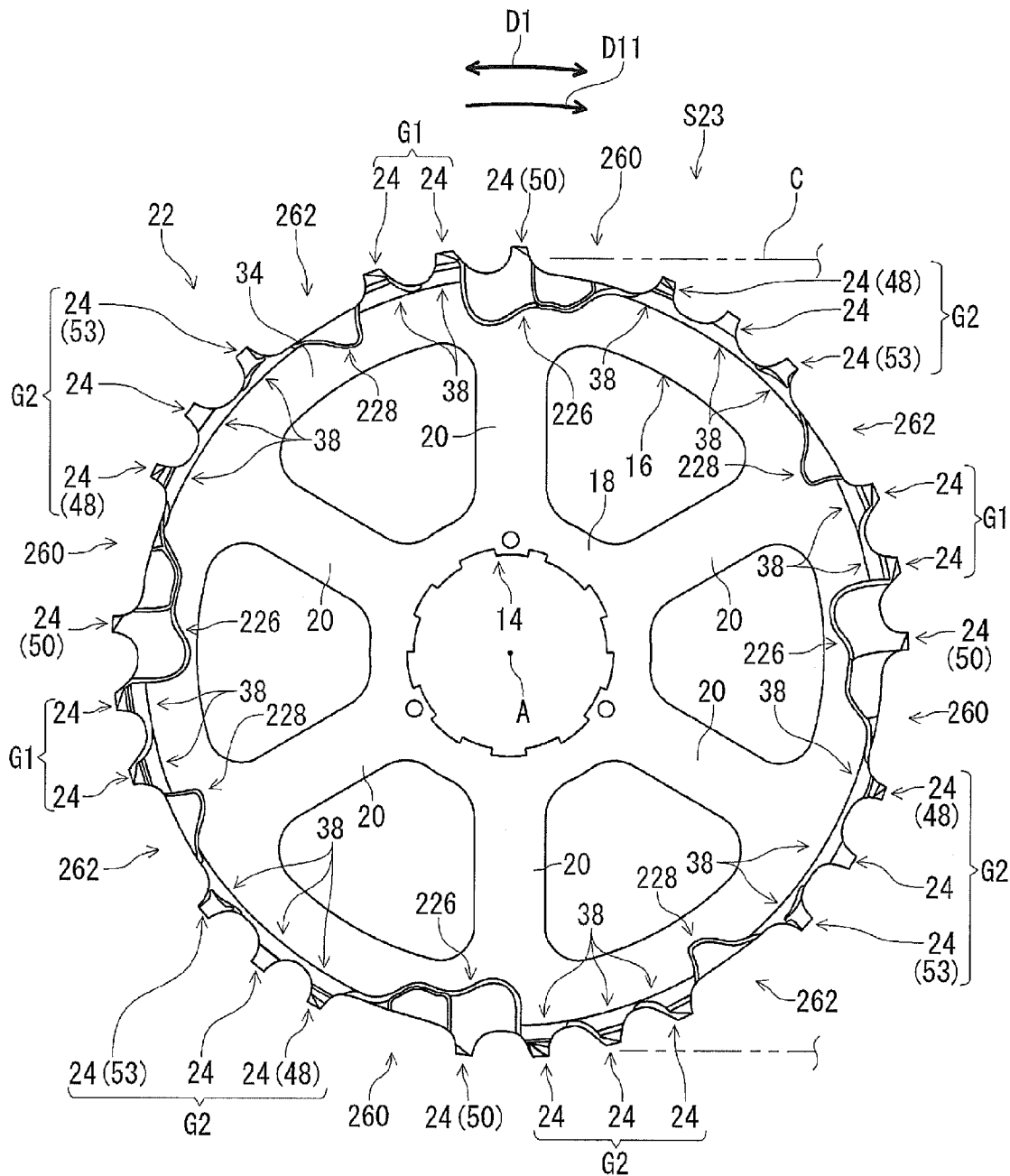
FIG. 18 is a right-side elevational view of a bicycle sprocket in accordance with a second embodiment.

As seen in FIG. 18, the chain engagement structure 22 of the bicycle sprocket S23 includes at least one shifting facilitation area 226 and/or 228 configured to facilitate changing gears. Unlike the shifting facilitation areas 26 and 28 in accordance with the first embodiment, the at least one shifting facilitation area 226 and/or 228 includes a tooth-free gap from which an additional chain-engaging tooth is free between adjacent two of the plurality of chain-engaging teeth 24. In the illustrated embodiment, the upshifting facilitation area 226 includes a tooth-free gap 260 from which an additional chain-engaging tooth is free between adjacent two of the plurality of chain-engaging teeth 24. The downshifting facilitation area 228 includes a tooth-free gap 262 from which an additional chain-engaging tooth is free between adjacent two of the plurality of chain-engaging teeth 24.

In the illustrated embodiment, the upshifting facilitation tooth 49 is omitted from each of the upshifting facilitation areas 226 to provide the tooth-free gap 260 between adjacent two of the plurality of chain-engaging teeth 24. The downshifting facilitation tooth 52 is omitted from each of the downshifting facilitation areas 228 to provide the tooth-free gap 262 between adjacent two of the plurality of chain-engaging teeth 24.

The tooth-free gap 260 is arranged to facilitate disengagement of the bicycle chain C from the bicycle sprocket S23 in the state where the bicycle chain C is offset toward the neighboring smaller sprocket S4 (FIG. 2) in the axial direction D2. The tooth-free gap 262 is arranged to facilitate catching the bicycle chain C by the chain-engaging tooth 24 in a state where the bicycle chain C is positioned closer to the bicycle sprocket S3 without engaging with the bicycle sprocket S3.

With the bicycle sprocket S23, since the at least one shifting facilitation area 226 and/or 228 includes the tooth-free gap 260 or 262, it is possible to facilitate changing gears in addition to the advantageous effect obtained by the bicycle sprocket S3 in accordance with the first embodiment.

While the upshifting facilitation tooth 49 and the downshifting facilitation tooth 52 are omitted from the shifting facilitation areas 226 and 228, one of the upshifting facilitation tooth 49 and the downshifting facilitation tooth 52 can be provided in the shifting facilitation area if needed and/or desired. Furthermore, the upshifting facilitation tooth 50 can be omitted from the upshifting facilitation area 226 instead of or in addition to the upshifting facilitation tooth 49 if needed and/or desired.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" or "element" when used in the singular can have the dual meaning of a single part or a plurality of parts.

The ordinal numbers such as the terms "first" or "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings.

It is therefore to be understood that within the scope of the appended claims, the invention may be practiced otherwise than as specifically described herein.

What is claimed is:

1. A bicycle sprocket having a rotational center axis, the bicycle sprocket comprising:
    a sprocket body having an axial width defined in an axial direction parallel to the rotational center axis; and
    a chain engagement structure arranged on a radially outer periphery of the sprocket body, the chain engagement structure including:
        at least one shifting facilitation area configured to facilitate changing gears; and
        a plurality of chain-engaging teeth including at least two neighboring chain-engaging teeth each including a chain-engaging portion configured to engage with a bicycle chain, the chain-engaging portion having an axial chain-engaging width defined in the axial direction, the axial chain-engaging width being larger than the axial width of the sprocket body, the chain-engaging portion being configured to face a link plate of the bicycle chain in the axial direction.

2. The bicycle sprocket according to the claim 1, wherein the at least one shifting facilitation area includes an axially recessed portion.

3. The bicycle sprocket according to the claim 1, wherein the at least one shifting facilitation area includes a tooth-free gap from which an additional chain-engaging tooth is free between adjacent two of the plurality of chain-engaging teeth.

4. The bicycle sprocket according to the claim 1, wherein the chain engagement structure includes, as the at least one shifting facilitation area, at least one downshifting facilitation area configured to facilitate shifting the bicycle chain from a neighboring smaller sprocket toward the bicycle sprocket, and
the neighboring smaller sprocket is adjacent to the bicycle sprocket without another sprocket and has a total number of teeth less than a total number of the plurality of chain-engaging teeth.

5. The bicycle sprocket according to the claim 1, wherein the chain engagement structure includes, as the at least one shifting facilitation area, at least one upshifting facilitation area configured to facilitate shifting the bicycle chain from the bicycle sprocket toward a neighboring smaller sprocket, and
the neighboring smaller sprocket is adjacent to the bicycle sprocket without another sprocket and has a total number of teeth less than a total number of the plurality of chain-engaging teeth.

6. The bicycle sprocket according to the claim 1, wherein the chain engagement structure includes, as the at least one shifting facilitation area,
    at least one downshifting facilitation area configured to facilitate shifting the bicycle chain toward the bicycle sprocket from a neighboring smaller sprocket which is adjacent to the bicycle sprocket without another sprocket and which has a total number of teeth less than a total number of the plurality of chain-engaging teeth, and
    at least one upshifting facilitation area configured to facilitate shifting the bicycle chain from the bicycle sprocket toward the neighboring smaller sprocket.

7. The bicycle sprocket according to the claim 1, wherein the bicycle sprocket body includes a hub engagement portion configured to engage with a bicycle hub assembly.

8. The bicycle sprocket according to the claim 1, wherein the chain-engaging portion is configured to partly engage with the link plate of the bicycle chain in a radial direction of the bicycle sprocket.

9. The bicycle sprocket according to the claim 1, wherein the axial chain-engaging width is smaller than an axial inner distance defined between opposed inner link plates of the bicycle chain in the axial direction, and
a difference between the axial chain-engaging width and the axial inner distance is equal to or smaller than 0.2 mm in the axial direction.

10. The bicycle sprocket according to the claim 1, wherein the axial chain-engaging width is smaller than an axial inner distance defined between opposed inner link plates of the bicycle chain in the axial direction, and
a difference between the axial chain-engaging width and the axial inner distance is equal to or larger than 0.1 mm in the axial direction.

11. A bicycle sprocket assembly comprising:
a plurality of the bicycle sprockets according to claim 1.

12. The bicycle sprocket assembly according to the claim 11, further comprising:
    a hub engagement structure configured to engage with a bicycle hub assembly.

13. A bicycle sprocket assembly having a rotational center axis, the bicycle sprocket assembly comprising:
    a first sprocket including:
        a first sprocket body; and
        a first chain engagement structure arranged on a radially outer periphery of the first sprocket body, the first chain engagement structure including:
            at least one first shifting facilitation area configured to facilitate changing gears; and
            a plurality of first chain-engaging teeth, at least one of the plurality of first chain-engaging teeth including a first chain-engaging portion configured to engage with a bicycle chain, the first chain-engaging portion having a first axial chain-engaging width defined in an axial direction parallel to the rotational center axis; and
    a second sprocket including:
        a second sprocket body; and
        a second chain engagement structure arranged on a radially outer periphery of the second sprocket body, the second chain engagement structure including:
            at least one second shifting facilitation area configured to facilitate changing gears; and
            a plurality of second chain-engaging teeth, at least one of the plurality of second chain-engaging teeth including a second chain-engaging portion configured to engage with the bicycle chain, the second chain-engaging portion having a second axial chain-engaging width defined in the axial direction, the first axial chain-engaging width being different from the second axial chain-engaging width, a total number of the plurality of second chain-engaging teeth being smaller than a total number of the plurality of first chain-engaging teeth.

14. The bicycle sprocket assembly according to the claim 13, wherein
the second axial chain-engaging width is larger than the first axial chain-engaging width.

15. The multiple bicycle sprocket assembly according to the claim 13, wherein
the first sprocket body has a first axial width defined in the axial direction, and the first axial chain-engaging width is larger than the first axial width of the first sprocket body.

16. The multiple bicycle sprocket assembly according to the claim 13, wherein
the second sprocket body has a second axial width defined in the axial direction, and
the second axial chain-engaging width is larger than the second axial width of the second sprocket body.

17. A bicycle sprocket assembly having a rotational center axis, the bicycle sprocket assembly comprising:
a first sprocket including:
a first sprocket body; and
a first chain engagement structure arranged on a radially outer periphery of the first sprocket body, the first chain engagement structure including:
at least one first shifting facilitation area configured to facilitate changing gears; and
a plurality of first chain-engaging teeth, at least one of the plurality of first chain-engaging teeth including a first chain-engaging portion configured to engage with a bicycle chain, the first chain-engaging portion having a first axial chain-engaging width defined in an axial direction parallel to the rotational center axis;
a second sprocket including:
a second sprocket body; and
a second chain engagement structure arranged on a radially outer periphery of the second sprocket body, the second chain engagement structure including:
at least one second shifting facilitation area configured to facilitate changing gears; and
a plurality of second chain-engaging teeth, at least one of the plurality of second chain-engaging teeth including a second chain-engaging portion configured to engage with the bicycle chain, the second chain-engaging portion having a second axial chain-engaging width defined in the axial direction, a total number of the plurality of second chain-engaging teeth being smaller than a total number of the plurality of first chain-engaging teeth;
a third sprocket positioned between the first sprocket and the second sprocket in the axial direction and adjacent to the first sprocket without another sprocket, the third sprocket including:
a third sprocket body; and
a third chain engagement structure arranged on a radially outer periphery of the third sprocket body, the third chain engagement structure including:
at least one third shifting facilitation area configured to facilitate changing gears; and
a plurality of third chain-engaging teeth, at least one of the plurality of third chain-engaging teeth including a third chain-engaging portion configured to engage with the bicycle chain, the third chain-engaging portion having a third axial chain-engaging width defined in the axial direction, a total number of the plurality of third chain-engaging teeth being smaller than the total number of the plurality of first chain-engaging teeth and larger than the total number of the plurality of second chain-engaging teeth;
a fourth sprocket positioned between the second sprocket and the third sprocket in the axial direction and adjacent to the second sprocket without another sprocket, the fourth sprocket including:
a fourth sprocket body; and
a fourth chain engagement structure arranged on a radially outer periphery of the fourth sprocket body, the fourth chain engagement structure including:
at least one fourth shifting facilitation area configured to facilitate changing gears; and
a plurality of fourth chain-engaging teeth, at least one of the plurality of fourth chain-engaging teeth including a fourth chain-engaging portion configured to engage with the bicycle chain, the fourth chain-engaging portion having a fourth axial chain-engaging width defined in the axial direction, a total number of the plurality of fourth chain-engaging teeth being smaller than the total number of the plurality of third chain-engaging teeth and larger than the total number of the plurality of second chain-engaging teeth;
the first chain-engaging portion of the first chain-engaging tooth being apart from the third chain-engaging portion of the third chain-engaging tooth by a first axial distance defined in the axial direction;
the second chain-engaging portion of the second chain-engaging tooth being apart from the fourth chain-engaging portion of the fourth chain-engaging tooth by a second axial distance defined in the axial direction; and
the first axial distance being different from the second axial distance.

18. The bicycle sprocket assembly according to the claim 17, wherein
the second axial distance is larger than the first axial distance.

19. The bicycle sprocket assembly according to the claim 17, wherein
the first sprocket body has a first axial width defined in the axial direction, and
the first axial chain-engaging width is larger than the first axial width of the first sprocket body.

20. The bicycle sprocket assembly according to the claim 17, wherein
the second sprocket body has a second axial width defined in the axial direction, and
the second axial chain-engaging width is larger than the second axial width of the second sprocket body.

21. The bicycle sprocket assembly according to the claim 17, wherein
the third sprocket body has a third axial width defined in the axial direction, and
the third axial chain-engaging width is larger than the third axial width of the third sprocket body.

22. The bicycle sprocket assembly according to the claim 17, wherein
the fourth sprocket body has a fourth axial width defined in the axial direction, and
the fourth axial chain-engaging width is larger than the fourth axial width of the fourth sprocket body.

23. The bicycle sprocket according to the claim 1, wherein
the chain-engaging portion includes a first chain-engaging surface and a second chain-engaging surface opposite to the first chain-engaging surface in the axial direction,
the first chain-engaging surface faces in the axial direction,
the second chain-engaging surface faces in the axial direction, and
the axial chain-engaging width is defined between the first chain-engaging surface and the second chain-engaging surface in the axial direction.

24. The bicycle sprocket according to the claim 23, wherein one of the first chain-engaging surface and the second chain-engaging surface is a flat surface facing in the axial direction.

25. The bicycle sprocket according to the claim 23, wherein
   the plurality of chain-engaging teeth include tooth bottoms defining a root circle, and
   the root circle is disposed on one of the first chain-engaging surface and the second chain-engaging surface when viewed from the axial direction.

* * * * *